(12) United States Patent
Tanimoto et al.

(10) Patent No.: US 6,188,205 B1
(45) Date of Patent: Feb. 13, 2001

(54) POWER SYSTEM CONTROL APPARATUS AND POWER SYSTEM CONTROL METHOD

(75) Inventors: Masahiko Tanimoto; Yoshio Izui; Yasuyuki Kowada; Kenji Iba, all of Tokyo; Naoto Fukuta, Osaka; Kenichi Deno, Osaka; Tetsuo Sasaki, Osaka, all of (JP)

(73) Assignees: Mitsubishi Denki Kabushiki Kaisha, Tokyo; The Kansai Electric Power Co., Inc., Osaka, both of (JP)

( * ) Notice: Under 35 U.S.C. 154(b), the term of this patent shall be extended for 0 days.

(21) Appl. No.: 09/521,209

(22) Filed: Mar. 8, 2000

(30) Foreign Application Priority Data

Mar. 9, 1999 (JP) .................................................. 11-062301

(51) Int. Cl.⁷ ...................................................... G05F 1/70
(52) U.S. Cl. .......................................... 323/205; 323/207
(58) Field of Search ................................... 323/205, 206, 323/207, 210, 211

(56) References Cited

U.S. PATENT DOCUMENTS

| | | | |
|---|---|---|---|
| 4,752,726 | * | 6/1988 | Aoyama ................................ 323/207 |
| 4,755,738 | * | 7/1988 | Shimamura et al. ................. 323/210 |
| 5,798,634 | * | 8/1998 | Terada et al. ......................... 323/207 |

FOREIGN PATENT DOCUMENTS 2114825   4/1990   (JP) .
531763    5/1993   (JP) .

OTHER PUBLICATIONS

Liu et al., "A New Concept For Tertiary Coordination Of Secondary Voltage Control On A Large Power Network", pp. 995–1002 (No Date).

* cited by examiner

*Primary Examiner*—Jessica Han
(74) *Attorney, Agent, or Firm*—Leydig, Voit & Mayer, Ltd.

(57) ABSTRACT

A desired value of reactive power flow between a to-be-controlled power system and an adjoining power system is determined according to measured values of the reactive power flow and an effective power flow and desired voltage values of the to-be-controlled power system and of the adjoining power system. Thereafter, a required value of a reactive power of the to-be-controlled power system is calculated according to the desired value of the reactive power flow, the measured values of the reactive power flow and the effective power flow, and the desired voltage value and a measured voltage value in the to-be-controlled power system. Thereafter, a control apparatus having an electric capacity near to the required value of the reactive power is selected from control apparatus arranged in the to-be-controlled power system to make the selected control apparatus adjust a voltage of the to-be-controlled power system. Therefore, cooperation of the to-be-controlled power system with the adjoining power system can be performed by collecting locally-existing-information, and a voltage fluctuation and/or a reactive power fluctuation in the to-be-controlled power system can be immediately suppressed.

15 Claims, 17 Drawing Sheets

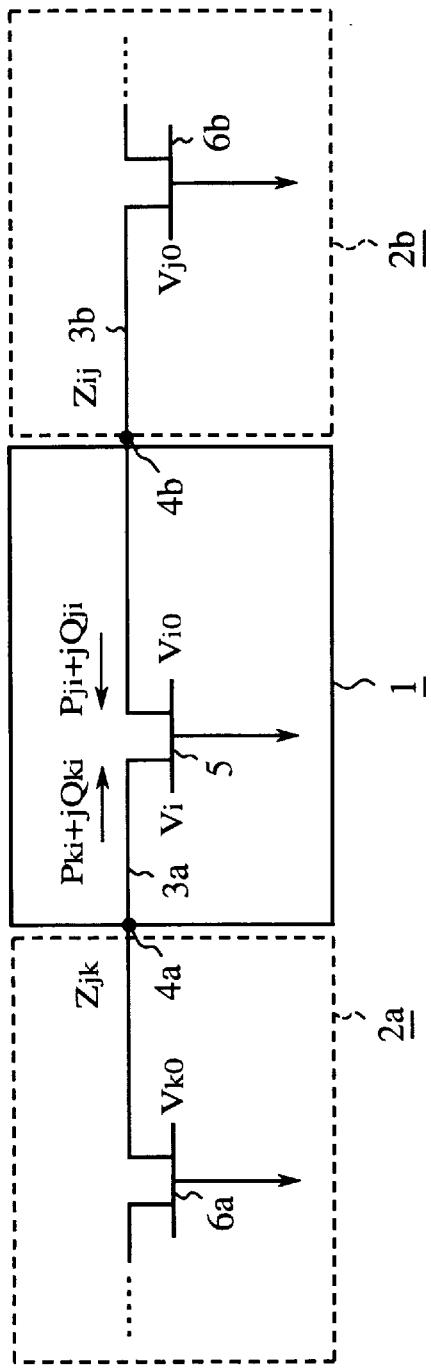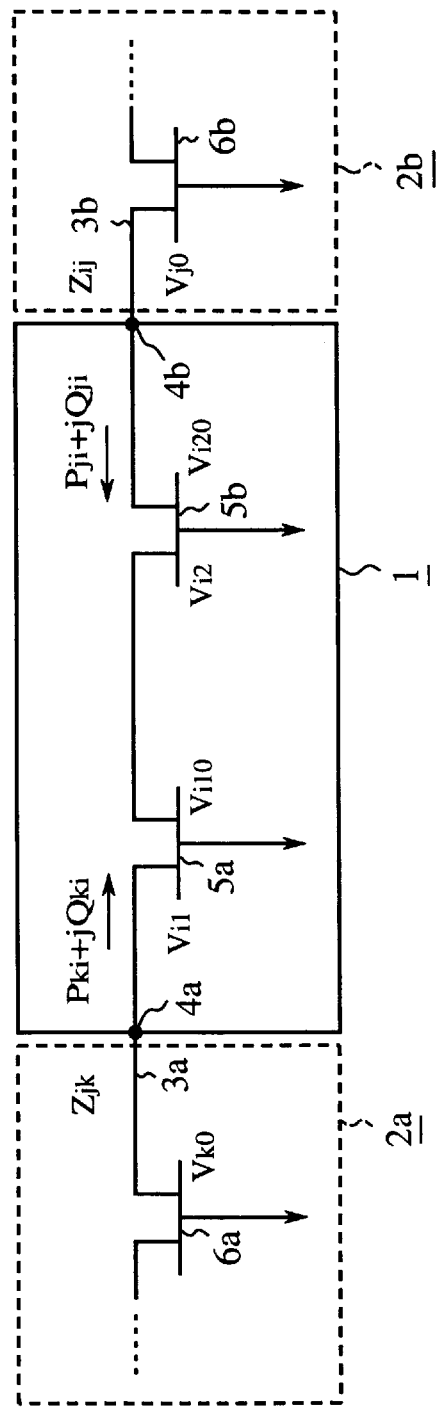

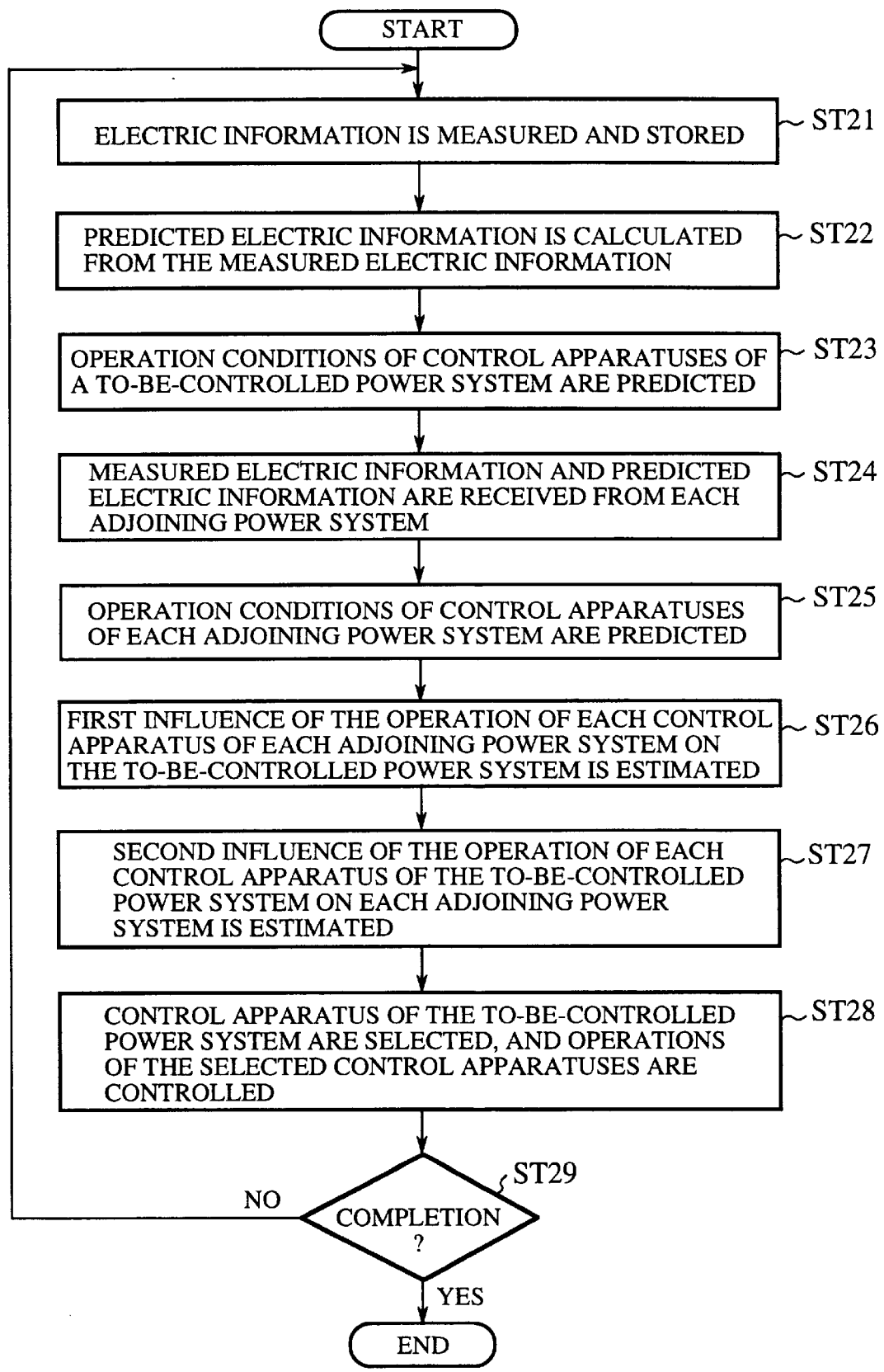

POWER SYSTEM CONTROL APPARATUS AND POWER SYSTEM CONTROL METHOD

BACKGROUND OF THE INVENTION

1. Field of the Invention

The present invention relates to a power system control apparatus and a power system control method in which voltage and reactive power in a power system are adjusted to desired values by operating a control apparatus of the power system.

2. Description of Related Art

As is disclosed in pages 1200–1201 of lectures of a National Conference of Japanese Electrotechnical Committee held in 1987, in a conventional power system control method, a voltage of a first substation corresponding to one power system and a reactive power flow transmitted through a bank are measured, and phase modifying equipment (for example, a transformer tap, a condenser, a reactor and the like) arranged in the first substation is controlled according to measured values.

Accordingly, in cases where the first substation is isolated from another substation, a voltage fluctuation in the first substation can be suppressed according to the conventional power system control method by controlling the phase modifying equipment.

However, in cases where the first substation is connected with a second substation, because a voltage fluctuation of the second substation adjacent to the first substation is not considered, there is a drawback that voltages of the first and second substations adjacent to each other become unstable.

Also, to prevent hunting in a control operation repeatedly performed in the phase modifying equipment by suppressing voltage fluctuations occurring in substations (or power systems) adjacent to each other, a method for controlling all apparatus of the power systems adjacent to each other by collecting all information of the power systems as one package is disclosed in pages 1115–1120, Vol. B117-8, theses in Japanese Electrotechnical Committee. However, in this method, the amount of data included in the information is too large to be processed, so it is difficult to increase control precision of the apparatus because it is required to identify the power systems, and a control time period for the apparatus is undesirably lengthened.

SUMMARY OF THE INVENTION

To solve the above drawbacks, an object of the present invention is to provide a power system control apparatus and a power system control method in which a voltage fluctuation and a reactive power fluctuation in a to-be-controlled power system are immediately suppressed by collecting pieces of information locally existing in the to-be-controlled power system and an adjoining power system adjacent to the to-be-controlled power system so as to perform a cooperation of the to-be-controlled power system with the adjoining power system.

The object is achieved by the provision of a power system control apparatus, comprising:

power flow measuring means for measuring a value of a reactive power flow and a value of an effective power flow, which respectively flow between a to-be-controlled power system and an adjoining power system adjacent to the to-be-controlled power system, for each of one or a plurality of adjoining power systems;

desired value determining means for determining a desired value of the reactive power flow or a desired summed value of the reactive power flows according to the measured values of the reactive power flows and the measured values of the effective power flows obtained by the power flow measuring means, a desired voltage value of the to-be-controlled power system and one or a plurality of desired voltage values of the adjoining power systems;

required value calculating means for calculating a required value of a reactive power of the to-be-controlled power system according to the measured values of the reactive power flows and the measured values of the effective power flows obtained by the power flow measuring means, the desired value of the reactive power flow or the desired summed value of the reactive power flows determined by the desired value determining means, the desired voltage value of the to-be-controlled power system and a measured voltage value of the to-be-controlled power system; and control means for selecting a control apparatus from a plurality of control apparatuses arranged in the to-be-controlled power system according to the required value of the reactive power calculated by the required value calculating means and controlling an operation of the selected control apparatus to make the selected control apparatus reduce the required value of the reactive power of the to-be-controlled power system.

In the above configuration, pieces of locally-existing information composed of a measured value of a reactive power flow and a measured value of an effective power flow flowing between the to-be-controlled power system and each adjoining power system, the desired voltage value of the to-be-controlled power system, the desired voltage values of the adjoining power systems and a measured voltage value of the to-be-controlled power system are collected, and a required value of a reactive power of the to-be-controlled power system is calculated by the required value calculating means according to the locally-existing information. Thereafter, a control apparatus having an electric capacity near to the required value of the reactive power is selected from a plurality of control apparatuses arranged in the to-be-controlled power system, and the selected control apparatus is controlled by the control means to make the selected control apparatus reduce the required value of the reactive power. Therefore, a voltage of the to-be-controlled power system is increased or decreased by the selected control apparatus, and the required value of the reactive power calculated by the required value calculating means approaches a zero value.

Accordingly, a cooperation of the to-be-controlled power system with the adjoining power systems can be performed by collecting the pieces of locally-existing information, and a voltage fluctuation and a reactive power fluctuation in the to-be-controlled power system can be immediately suppressed.

It is preferable that the required value of the reactive power calculated by the required value calculating means include a term which is obtained by multiplying a deviation value of the measured voltage value of the to-be-controlled power system from the desired voltage value of the to-be-controlled power system by a control constant.

Because a term corresponding to the deviation value between the measured and desired voltage values of the to-be-controlled power system is included in the required value of the reactive power, the voltage fluctuation and the reactive power fluctuation in the to-be-controlled partial power system can be reliably suppressed.

It is preferable that the power system control apparatus further comprise:

constant value changing means for changing a value of the control constant or the desired voltage value of the to-be-controlled power system in cases where a system configuration of the to-be-controlled power system and the adjoining power systems is changed.

Even though a plurality of adjoining power systems exist, because the value of the control constant is changed with the system configuration, the voltage fluctuation and the reactive power fluctuation in the to-be-controlled partial power system can be reliably suppressed even though the system configuration is changed.

It is preferable that the power system control apparatus further comprise:

constant value changing means for changing a value of the control constant in cases where the desired voltage value of the to-be-controlled power system or the desired voltage value of one adjoining power system is changed.

In cases where operation conditions of the to-be-controlled power system or the adjoining power system are changed, the desired voltage value of the to-be-controlled power system or the adjoining power system is changed. Because the value of the control constant is changed with the desired value of the to-be-controlled power system or the adjoining power, the voltage fluctuation and the reactive power fluctuation in the to-be-controlled partial power system can be reliably suppressed even though the operation conditions of the to-be-controlled power system or the adjoining power system are changed.

The object is also achieved by the provision of a power system control apparatus, comprising:

power flow measuring means for measuring a value of a reactive power flow and a value of an effective power flow flowing between each of partial power systems composing a to-be-controlled power system and an adjoining power system adjacent to the partial power system and measuring a value of a reactive power flow and a value of an effective power flow flowing between one pair of partial power systems adjacent to each other for each pair of partial power systems adjacent to each other;

desired value determining means for determining a desired value of the reactive power flow flowing between one partial power system and the adjoining power system adjacent to the partial power system according to the measured value of the reactive power flow and the measured value of the effective power flow, which flow between the partial power system and the adjoining power system, obtained by the power flow measuring means, a desired voltage value of the partial power system and a desired voltage value of the adjoining power system for each partial power system and determining a desired value of the reactive power flow flowing between one pair of partial power systems adjacent to each other according to the measured value of the reactive power flow and the measured value of the effective power flow, which flow between the pair of partial power systems, obtained by the power flow measuring means, two desired voltage values of the pair of partial power systems for each pair of partial power systems adjacent to each other;

required value calculating means for calculating a required value of a reactive power of each partial power system according to the measured value of the reactive power flow and the measured value of the effective power flow, which flow between the partial power system and one adjoining power system adjacent to the partial power system, obtained by the power flow measuring means, the measured value of the reactive power flow and the measured value of the effective power flow, which flow between the partial power system and another partial power system adjacent to the partial power system, obtained by the power flow measuring means, the desired value of the reactive power flow, which flow between the partial power system and the adjoining power system, and the desired value of the reactive power flow, which flow between the partial power system and another partial power system adjacent to the partial power system, determined by the desired value determining means, the desired voltage value of the partial power system and a measured voltage value of the partial power system; and control means for selecting a control apparatus from a plurality of control apparatuses arranged in one partial power system according to the required value of the reactive power of the partial power system calculated by the required value calculating means for each partial power system and controlling an operation of the selected control apparatus of each partial power system to make the selected control apparatus reduce the required value of the reactive power of the partial power system.

In the above configuration, a to-be-controlled power system is divided into a plurality of partial power systems, each partial power system is adjacent to another partial power system and an adjoining power system. In this condition, pieces of locally-existing information composed of a measured value of a reactive power flow and a measured value of an effective power flow flowing between one partial power system and the adjoining power system adjacent to the partial power system, a measured value of a reactive power flow and a measured value of an effective power flow flowing between the partial power system and another partial power system adjacent to the partial power system, a desired voltage value of the partial power system, a desired voltage value of the adjoining power system, a desired voltage value of another partial power system adjacent to the partial power system, a measured voltage value of the partial power system and a measured voltage value of another partial power system adjacent to the partial power system are collected for each partial power system, and a required value of a reactive power of one partial power system is calculated by the required value calculating means according to the locally-existing information for each partial power system. Thereafter, a control apparatus having an electric capacity near to the required value of the reactive power of one partial power system is selected from a plurality of control apparatuses arranged in the partial power system for each partial power system, and the selected control apparatus is controlled by the control means for each partial power system to make the selected control apparatus reduce the required value of the reactive power of the partial power system. Therefore, a voltage of each partial power system is increased or decreased by the selected control apparatus, and the required value of the reactive power calculated by the required value calculating means approaches a zero value.

Accordingly, even though the to-be-controlled power system is divided into the partial power systems, a cooperation of the each partial power system with the adjoining power system and another partial power system adjacent to the partial power system can be performed by collecting the pieces of locally-existing information corresponding to the partial power system, and a voltage fluctuation and a reactive power fluctuation in each partial power system can be immediately suppressed.

It is preferable that the required value of the reactive power of each partial power system calculated by the required value calculating means include a term which is obtained by multiplying a deviation value of the measured voltage value of the partial power system from the desired voltage value of the partial power system by a control constant.

Because a term corresponding to the deviation value between the measured and desired voltage values of each partial power system is included in the required value of the reactive power of the partial power system, the voltage fluctuation and the reactive power fluctuation in each partial power system can be reliably suppressed.

It is preferable that the power system control apparatus further comprise:

constant value changing means for changing a value of the control constant or the desired voltage value of one partial power system in cases where a system configuration of the partial power systems and the adjoining power systems is changed.

Because the value of the control constant is changed with the system configuration, the voltage fluctuation and the reactive power fluctuation in the to-be-controlled partial power system can be reliably suppressed even though the system configuration is changed.

It is preferable that the power system control apparatus further comprise:

constant value changing means for changing a value of the control constant in cases where the desired voltage value of one partial power system or the desired voltage value of one adjoining power system is changed.

Even though the desired voltage value of one partial power system or one adjoining power is changed because operation conditions of the partial power system or the adjoining power are changed, because the value of the control constant is changed with the desired voltage value of the partial power system or the adjoining power, the voltage fluctuation and the reactive power fluctuation in the to-be-controlled partial power system can be reliably suppressed even though the operation conditions of the partial power system or the adjoining power system are changed.

The object is also achieved by the provision of a power system control apparatus, comprising:

system predicting means for receiving a load prediction of a to-be-controlled power system and one or a plurality of adjoining power systems adjacent to the to-be-controlled power system, predicting first electric information of the to-be-controlled power system and second electric information between the to-be-controlled power system and each adjoining power system by calculating a power flow between the to-be-controlled power system and each adjoining power system according to the load prediction;

operation predicting means for predicting an operation of each of one or a plurality of control apparatuses arranged in the to-be-controlled power system according to the first electric information and the second electric information predicted by the system predicting means; and schedule setting means for setting an operation schedule of the control apparatuses according to the operation prediction obtained by the operation predicting means to adjust the first electric information or the second electric information under control of the control apparatuses operated according to the operation schedule.

In the above configuration, when a load prediction such as a predicted value of a load fluctuation obtained from a load result is received, first electric information such as a voltage value and a power flow of a transmission line in the to-be-controlled power system is predicted according to the load prediction. Also, second electric information such as a power flow of an interconnection line connecting the to-be-controlled power system and each adjoining power system is predicted according to the load prediction. Thereafter, the operation of one or a plurality of control apparatuses used to reduce a voltage fluctuation or a reactive power fluctuation in the to-be-controlled power system is predicted according to the first electric information and the second electric information, and an operation schedule of the control apparatuses is set according to the operation prediction. Therefore, the control apparatuses are operated according to the operation schedule, and the first electric information or the second electric information is adjusted.

Accordingly, in cases where the control apparatuses are operated according to the operation schedule, a voltage fluctuation or a reactive power fluctuation in the to-be-controlled be-controlled power system can be immediately suppressed.

It is preferable that the power system control apparatus further comprise:

power flow measuring means for measuring a value of a reactive power flow and a value of an effective power flow, which respectively flow between the to-be-controlled power system and each adjoining power system adjacent to the to-be-controlled power system;

desired value determining means for determining a desired value of the reactive power flow according to the measured values of the reactive power flows and the measured values of the effective power flows obtained by the power flow measuring means, a desired voltage value of the to-be-controlled power system and one or a plurality of desired voltage values of the adjoining power systems;

required value calculating means for calculating a required value of a reactive power of the to-be-controlled power system according to the measured values of the reactive power flows and the measured values of the effective power flows obtained by the power flow measuring means, the desired value of the reactive power flow determined by the desired value determining means, the desired voltage value of the to-be-controlled power system and a measured voltage value of the to-be-controlled power system;

control means for selecting a control apparatus from the control apparatuses according to the required value of the reactive power calculated by the required value calculating means, determining an operation instruction required for the selected control apparatus according to the required value of the reactive power and providing the operation instruction for the selected control apparatus to make the selected control apparatus reduce the required value of the reactive power of the to-be-controlled power system in an operation of the selected control apparatus indicated by the operation instruction; and schedule revising means for revising the operation schedule of the control apparatuses set by the schedule setting means to make a revised operation schedule match with the operation of the control apparatus selected by the control means in cases where the control apparatus selected by the control means or the operation of the control apparatus selected by the control means does not match with the operation schedule of the control apparatuses, the control apparatuses being operated according to the revised operation schedule.

In cases where the selection of the control apparatus or the operation of the control apparatus determined by the control means does not match with the operation schedule of the control apparatuses, the operation schedule is revised to a revised operation schedule.

Accordingly, even though the load prediction is different from an actual load required for the to-be-controlled power system and the adjoining power systems, the operation schedule is revised to a revised operation schedule, the to-be-controlled power system and the adjoining power systems can be automatically controlled according to the revised operation schedule, so that the voltage fluctuation or the reactive power fluctuation in the to-be-controlled power system can be reliably suppressed.

The object is also achieved by the provision of a power system control apparatus, comprising:

electric information predicting means for calculating a predicted value of first electric information corresponding to a to-be-controlled power system from a measured value of the first electric information of the to-be-controlled power system;

communicating means for receiving a predicted value of second electric information and a measured value of the second electric information from each of one or a plurality of adjoining power systems adjacent to the to-be-controlled power system;

operation predicting means for predicting an operation of each of a plurality of first control apparatuses arranged in the to-be-controlled power system from the predicted value of the first electric information and the measured value of the first electric information obtained by the electric information predicting means and predicting an operation of each of a plurality of second control apparatuses arranged in one adjoining power system from the predicted value of the second electric information and the measured value of the second electric information received by the communicating means from the adjoining power system for each adjoining power system;

control means for selecting a particular first control apparatus from the first control apparatuses arranged in the to-be-controlled power system according to the operation prediction for the first control apparatuses and the operation prediction for the second control apparatuses obtained by the operation predicting means and controlling the selected control apparatus to adjust the first electric information of the to-be-controlled power system to the predicted value obtained by the electric information predicting means.

In the above configuration, a first influence of the operation prediction for the second control apparatuses of the adjoining power systems on the first electric information of the to-be-controlled power system is estimated by the control means, a second influence of the operation prediction for the first control apparatuses of the to-be-controlled power system on the second electric information of each adjoining power system is estimated by the control means, and a particular first control apparatus is selected by the control means from the first control apparatuses of the to-be-controlled power system according to the first influence, the second influence and the predicted value of the first electric information.

Accordingly, because the particular first control apparatus is selected by considering the operation prediction for the first and second control apparatuses of the to-be-controlled and adjoining power systems, a control apparatus optimum for the adjustment of the first electric information of the to-be-controlled power system can be selected by collecting locally-existing information composed of the first electric information and the second electric information, so that a fluctuation of the first electric information such as a voltage fluctuation or a reactive power fluctuation in the to-be-controlled power system can be immediately suppressed.

The object is also achieved by the provision of a power system control method, comprising the steps of:

measuring a value of a reactive power flow and a value of an effective power flow, which respectively flow between a to-be-controlled power system and an adjoining power system adjacent to the to-be-controlled power system;

determining a desired value of the reactive power flow according to the measured value of the reactive power flow and the measured value of the effective power flow, a desired voltage value of the to-be-controlled power system and a desired voltage value of the adjoining power system;

calculating a required value of a reactive power of the to-be-controlled power system according to the measured value of the reactive power flow, the measured value of the effective power flow, the desired value of the reactive power flow, the desired voltage value of the to-be-controlled power system and a measured voltage value of the to-be-controlled power system;

selecting a control apparatus from a plurality of control apparatuses arranged in the to-be-controlled power system according to the required value of the reactive power; and controlling an operation of the selected control apparatus to make the selected control apparatus reduce the required value of the reactive power of the to-be-controlled power system.

In the above steps, a cooperation of the to-be-controlled power system with the adjoining power system can be performed by collecting pieces of locally-existing information, and a voltage fluctuation and a reactive power fluctuation in the to-be-controlled power system can be immediately suppressed.

The object is also achieved by the provision of a power system control method, comprising the steps of:

measuring a value of a reactive power flow and a value of an effective power flow flowing between each of partial power systems composing a to-be-controlled power system and an adjoining power system adjacent to the partial power system;

measuring a value of a reactive power flow and a value of an effective power flow flowing between one pair of partial power systems adjacent to each other for each pair of partial power systems adjacent to each other;

determining a desired value of the reactive power flow flowing between one partial power system and the adjoining power system adjacent to the partial power system according to the measured value of the reactive power flow and the measured value of the effective power flow flowing between the partial power system and the adjoining power system, a desired voltage value of the partial power system and a desired voltage value of the adjoining power system for each partial power system;

determining a desired value of the reactive power flow flowing between one pair of partial power systems adjacent to each other according to the measured value of the reactive power flow and the measured value of the effective power flow flowing between the pair of partial power systems, and two desired voltage values of the pair of partial power systems for each pair of partial power systems adjacent to each other;

calculating a required value of a reactive power of each partial power system according to the measured value of the reactive power flow and the measured value of the effective power flow flowing between the partial power system and one adjoining power system adjacent to the partial power system, the measured value of the reactive power flow and the measured value of the effective power flow flowing between the partial power system and another partial power system adjacent to the partial power system, the desired value of the reactive power flow flowing between the partial power system and the adjoining power system, the desired value of the reactive power flow flowing between the partial power system and another partial power system adjacent to the partial power system, the desired voltage value of the partial power system and a measured voltage value of the partial power system;

selecting a control apparatus from a plurality of control apparatuses arranged in one partial power system according to the required value of the reactive power of the partial power system for each partial power system; and controlling an operation of the selected control apparatus of each partial power system to make the selected control apparatus reduce the required value of the reactive power of the partial power system.

In the above steps, even though the to-be-controlled power system is divided into the partial power systems, a cooperation of the each partial power system with the adjoining power system and another partial power system adjacent to the partial power system can be performed by collecting pieces of locally-existing information corresponding to the partial power system, and a voltage fluctuation and a reactive power fluctuation in each partial power system can be immediately suppressed.

The object is also achieved by the provision of a power system control method, comprising the steps of:

receiving a load prediction of a to-be-controlled power system and one or a plurality of adjoining power systems adjacent to the to-be-controlled power system;

predicting first electric information of the to-be-controlled power system and second electric information between the to-be-controlled power system and each adjoining power system by calculating a power flow between the to-be-controlled power system and each adjoining power system according to the load prediction;

predicting an operation of each of one or a plurality of control apparatuses arranged in the to-be-controlled power system according to the first electric information and the second electric information; and setting an operation schedule of the control apparatuses according to the operation prediction to operate the control apparatuses according to the operation schedule.

In the above steps, because the control apparatuses are operated according to the operation schedule, a voltage fluctuation or a reactive power fluctuation in the to-be-controlled be-controlled power system can be immediately suppressed.

The object is also achieved by the provision of a power system control method, comprising the steps of:

calculating a predicted value of first electric information corresponding to a to-be-controlled power system from a measured value of the first electric information of the to-be-controlled power system;

receiving a predicted value of second electric information and a measured value of the second electric information from each of one or a plurality of adjoining power systems adjacent to the to-be-controlled power system;

predicting an operation of each of a plurality of first control apparatuses arranged in the to-be-controlled power system from the predicted value of the first electric information and the measured value of the first electric information;

predicting an operation of each of a plurality of second control apparatuses arranged in one adjoining power system from the predicted value of the second electric information and the measured value of the second electric information received from the adjoining power system for each adjoining power system;

selecting a particular first control apparatus from the first control apparatuses arranged in the to-be-controlled power system according to the operation prediction for the first control apparatuses and the operation prediction for the second control apparatuses; and controlling the selected control apparatus to adjust the first electric information of the to-be-controlled power system to the predicted value.

In the steps, a control apparatus optimum for the adjustment of the first electric information of the to-be-controlled power system can be selected, so that a fluctuation of the first electric information such as a voltage fluctuation or a reactive power fluctuation in the to-be-controlled power system can be immediately suppressed.

BRIEF DESCRIPTION OF THE DRAWINGS

FIG. 5 is a diagram showing a power system to be controlled by the power system control apparatus shown in FIG. 4 and two adjoining power systems adjacent to the power system to be controlled;

FIG. 6 is a diagram showing a power system to be controlled and two adjoining power systems adjacent to the power system to be controlled according to another modification of the first embodiment;

FIG. 21 is a flow chart showing a power system control method applied for each power system control apparatus according to the seventh embodiment.

DETAILED DESCRIPTION OF THE PREFERRED EMBODIMENTS

The invention will now be described with reference to the accompanying drawings.

EMBODIMENT 1

Figure 1:
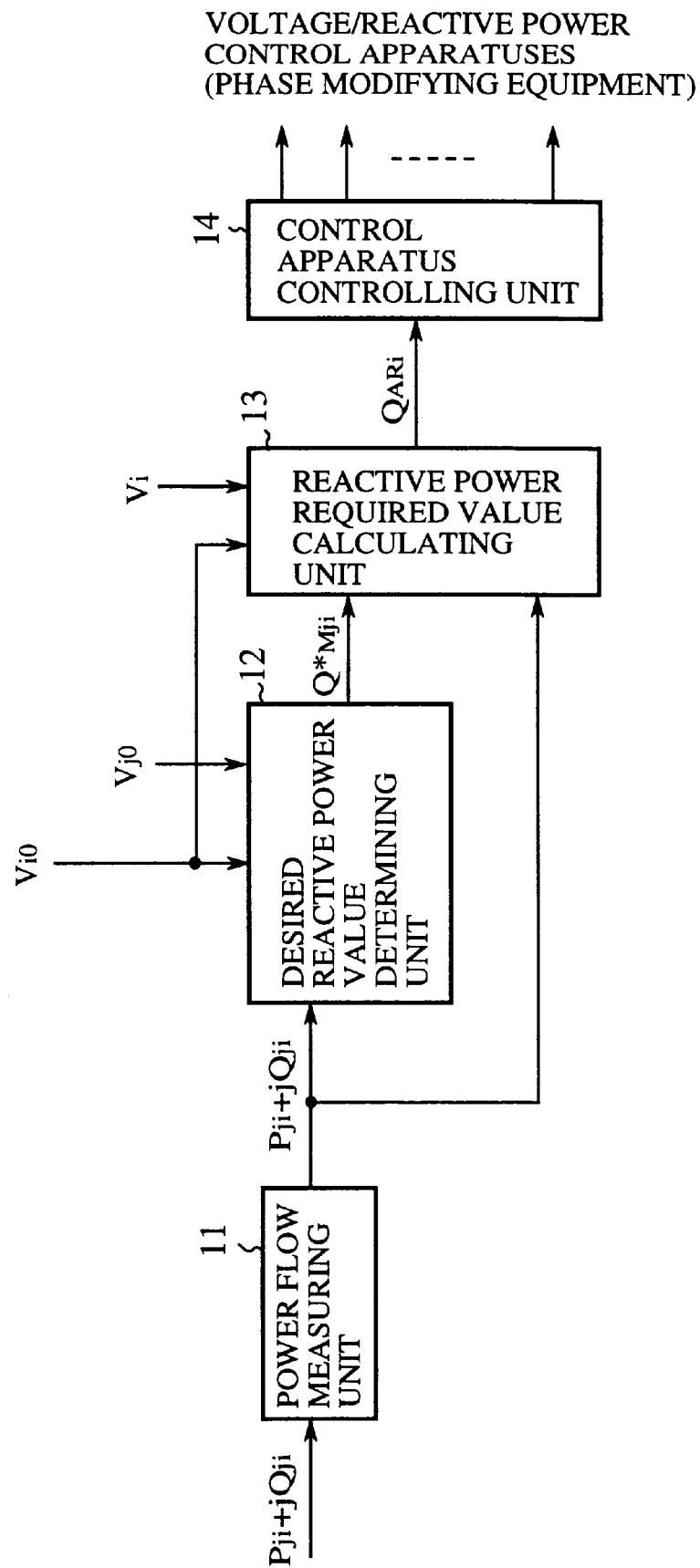
FIG. 1 is a block diagram of a power system control apparatus according to a first embodiment of the present invention.
Figure 2:
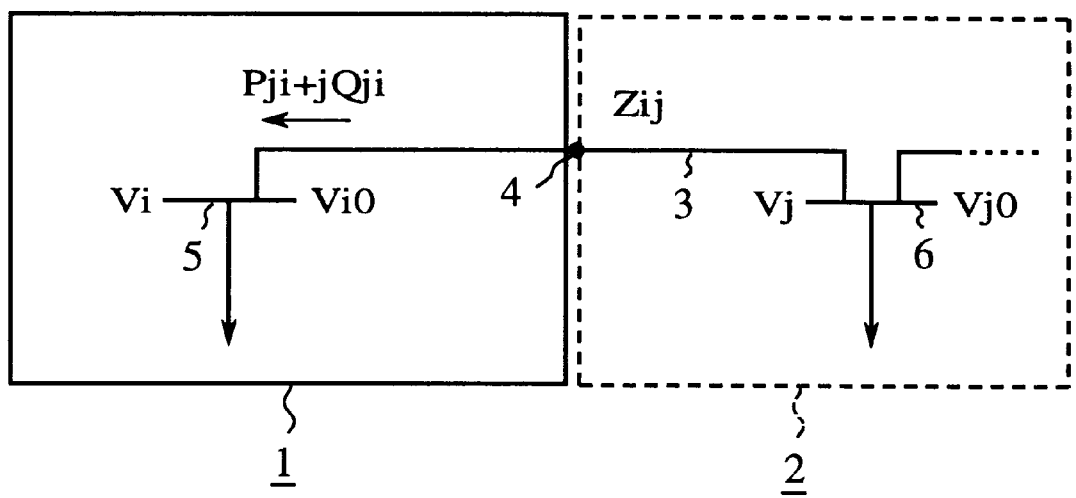
FIG. 2 is a diagram showing a power system to be controlled by the power system control apparatus shown in FIG. 1 and an adjoining power system adjacent to the power system to be controlled.

FIG. 1 is a block diagram of a power system control apparatus according to a first embodiment of the present invention, and FIG. 2 is a diagram showing a power system to be controlled by the power system control apparatus shown in FIG. 1 and an adjoining power system adjacent to the power system to be controlled.

As shown in FIG. 2, a power system 1 to be controlled (hereinafter, called a to-be-controlled power system) is adjacent to an adjoining power system 2 through a boundary point 4. The adjoining power system 2 comprises a voltage monitoring bus 6 at which a voltage value $V_j$ is measured and a desired voltage value is $V_{j0}$. The to-be-controlled power system 1 comprises a voltage monitoring bus 5 at which a voltage value $V_i$ is measured and a desired voltage value is $V_{i0}$. The boundary point 4 is placed at a mid position of an interconnection line 3 connecting the to-be-controlled power system 1 and the adjoining power system 2, and an effective power flow $P_{ji}$ and a reactive power flow $Q_{ji}$ flow from the adjoining power system 2 into the to-be-controlled power system 1 through the interconnection line 3.

As shown in FIG. 1, a power system control apparatus comprises:

a power flow measuring unit 11, functioning as a power flow measuring means, for measuring the effective power flow $P_{ji}$ and the reactive power flow $Q_{ji}$, which flow from the adjoining power system 2 into the to-be-controlled power system 1, at the voltage monitoring bus 5;

a desired reactive power value determining unit 12, functioning as a desired value determining means, for determining a value $Q^*_{Mji}$ of the reactive power flow desired at the boundary point 4 of the interconnection line 3 according to the desired voltage values $V_{i0}$ and $V_{j0}$ of the buses 5 and 6 and the effective power flow $P_{ji}$ and the reactive power flow $Q_{ji}$ flowing into the bus 5 of the to-be-controlled power system 1;

a reactive power required value calculating unit 13, functioning as a required value calculating means, for calculating a required value $Q_{ARi}$ of a reactive power in the to-be-controlled power system 1 according to the desired value $Q^*_{Mji}$ of the reactive power flow determined in the desired reactive power value determining unit 12, the effective power flow $P_{ji}$ and the reactive power flow $Q_{ji}$ measured in the power flow measuring unit 11, the measured voltage value $V_i$ of the bus 5 of the to-be-controlled power system 1 and the desired voltage value $V_{i0}$ of the bus 5 of the to-be-controlled power system 1, the reactive power required value $Q_{ARi}$ denoting a surplus/shortage reactive power in the to-be-controlled power system 1; and a control apparatus controlling unit 14, functioning as a control means, for selecting one or more control apparatuses to be controlled from all voltage/reactive power control apparatuses existing in the to-be-controlled power system 1 and controlling the selected control apparatuses to adjust a voltage value at the bus 5 for the purpose of reducing the reactive power required value $Q_{ARi}$ calculated in the reactive power required value calculating unit 13 to a zero value.

The effective power flow $P_{ji}$ and the reactive power flow $Q_{ji}$ flowing from the to-be-controlled power system 1 into the adjoining power system 2 are respectively measured as a negative value in the power flow measuring unit 11. In the desired reactive power value determining unit 12, the desired value $Q^*_{Mji}$ of the reactive power flow flowing from the adjoining power system 2 into the to-be-controlled be-controlled power system 1 is set to a positive value, and the desired value $Q^*_{Mji}$ of the reactive power flow flowing from the to-be-controlled power system 1 into the adjoining power system 2 is set to a negative value.

In the above configuration, an operation of the power system control apparatus is described with reference to FIG. 3.

Figure 3:
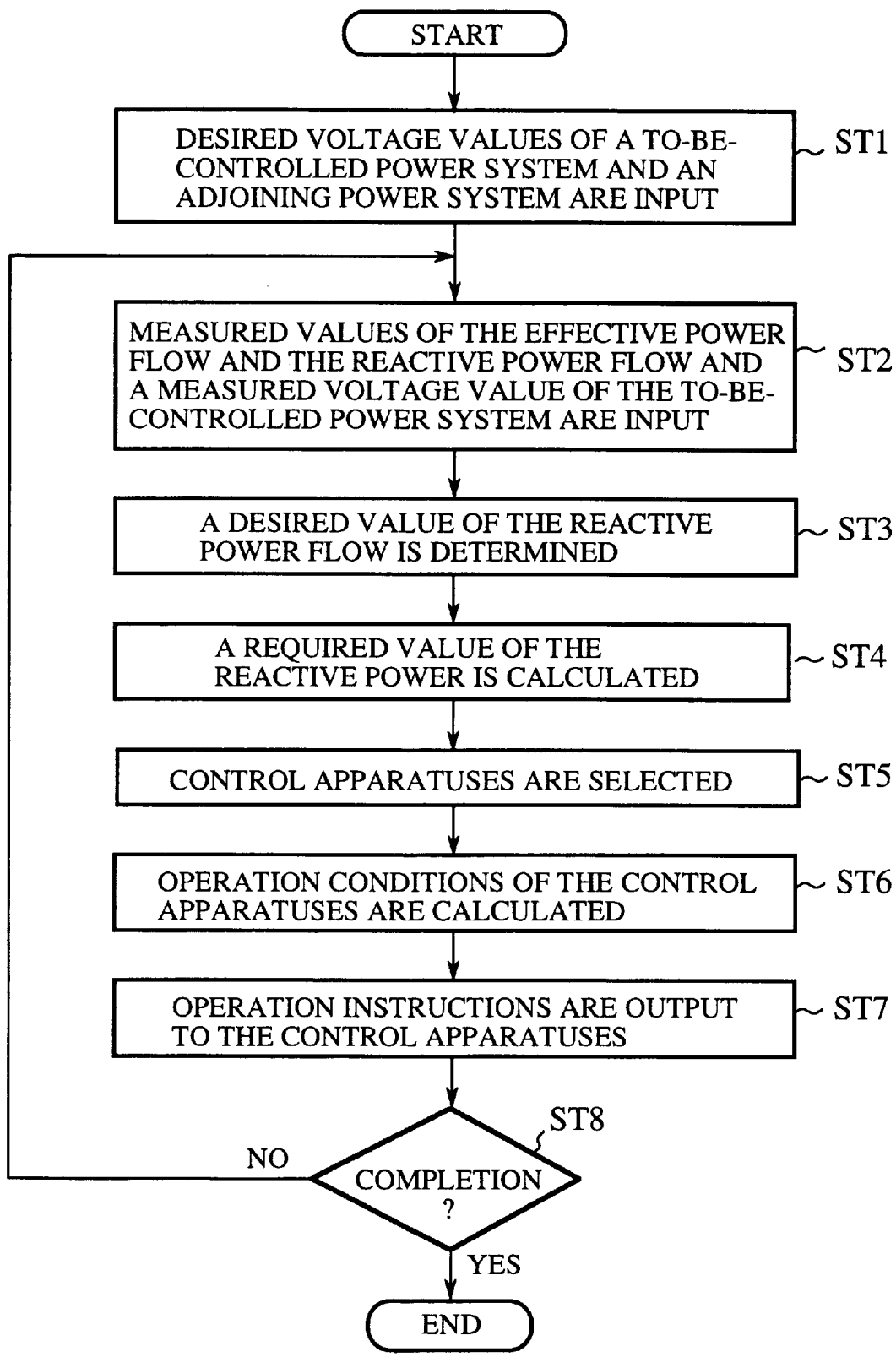
FIG. 3 is a flow chart showing a power system control method applied for the power system control apparatus shown in FIG. 1.

FIG. 3 is a flow chart showing a power system control method applied for the power system control apparatus shown in FIG. 1.

When a value $P_{ji}$ of an effective power flow and a value $Q_{ji}$ of a reactive power flow at the voltage monitoring bus 5 of the to-be-controlled power system 1 are measured in the power flow measuring unit 11 as measured values of the power flows flowing from the adjoining power system 2 into the to-be-controlled power system 1, a desired voltage value $V_{i0}$ of the bus 5 is input to the desired reactive power value determining unit 12 and the reactive power required value calculating unit 13, and a desired voltage value $V_{j0}$ of the voltage monitoring bus 6 is input to the desired reactive power value determining unit 12 (step ST1). The desired voltage values $V_{i0}$ and $V_{j0}$ are set in advance. Also, the measured values $P_{ji}$ and $Q_{ji}$ of the effective power flow and the reactive power flow at the bus 5 are input to the desired reactive power value determining unit 12 and the reactive power required value calculating unit 13, and a measured voltage value $V_i$ of the bus 5 is input to the reactive power required value calculating unit 13 (step ST2).

Thereafter, a desired value $Q^*_{Mji}$ of the reactive power flow flowing from the adjoining power system 2 into the to-be-controlled power system 1 through the interconnection line 3 is determined in the desired reactive power value determining unit 12 according to the desired voltage values $V_{i0}$ and $V_{j0}$ of the buses 5 and 6, the measured value $P_{ji}$ of the effective power flow at the bus 5 and the measured value $Q_{ji}$ of the reactive power flow at the bus 5 (step ST3). The desired value $Q^*_{Mji}$ is obtained according to an equation (1).

$$Q^*_{Mji}=R/(R^2+X^2)^*(RQ_{ji}-XP_{ji})+X/\{2(R^2+X^2)\}^*(V^2_{i0}-V^2_{j0}) \quad (1)$$

The desired value $Q^*_{Mji}$ of the reactive power flow is a value of the reactive power flow at the boundary point 4, a symbol R denotes a real part of an impedance $Z_{ij}$ of the interconnection line 3 connecting the to-be-controlled power system 1 and the adjoining power system 2, a symbol X denotes an imaginary part (or reactance) of the impedance $Z_{ij}$ ($Z_{ij}$=R+ jX), and a value $P_{ji}$+$jQ_{ji}$ denotes a power flow, which flows from the adjoining power system 2 into the to-be-controlled power system 1, measured at the bus 5 of the to-be-controlled power system 1.

Because the boundary point 4 between the to-be-controlled power system 1 and the adjoining power system 2 is placed at the mid position of the interconnection line 3, in cases where the measured voltage value $V_j$ of the bus 6 of the adjoining power system 2 agrees with the desired voltage value $V_{j0}$ set in advance and in cases where an effective power flow actually flowing the interconnection line 3 agrees with the effective power flow $P_{ji}$ at the bus 5 measured in the power flow measuring unit 11, the desired value $Q^*_{Mji}$ of the reactive power flow obtained in the equation (1) denotes an appropriate reactive power flow value required at the boundary point 4 to make the measured voltage value $V_i$ of the bus 5 of the to-be-controlled power system 1 agree with the desired voltage value $V_{i0}$ of the bus 5.

Accordingly, though the boundary point 4 between the to-be-controlled power system 1 and the adjoining power system 2 is placed at the mid position of the interconnection line 3 in this embodiment, it is not required in the present invention to place the boundary point 4 at the mid position of the interconnection line 3. Also, though a measuring point of the power flows $P_{ji}$ and $Q_{ji}$ is set to the bus 5 of the first power system 1, it is not required in the present invention to place the measuring point at the bus 5. Therefore, in cases where the boundary point 4 is not placed at the mid position of the interconnection line 3 or in cases where the measuring point of the power flows $P_{ji}$ and $Q_{ji}$ is not placed at the bus 5, the equation (1) is properly modified, so that the desired value $Q^*_{Mji}$ of the reactive power flow can be appropriately obtained according to a modified equation.

Thereafter, when the desired value $Q^*_{Mji}$ of the reactive power flow flowing the interconnection line 3 is determined in the desired reactive power value determining unit 12, a value $Q_{Mji}$ of the reactive power flow at the boundary point 4 of the interconnection line 3 is calculated in the reactive power required value calculating unit 13 according to the effective power flow $P_{ji}$ and the reactive power flow $Q_{ji}$ measured in the power flow measuring unit 11 and the measured voltage value $V_i$ of the bus 5. The reactive power flow value $Q_{Mji}$ is obtained according to an equation (2).

$$Q_{Mji}=Q_{ji}+X(p^2_{ji}+Q^2_{ji})/(2V^2_i) \quad (2)$$

The reactive power flow value $Q_{Mji}$ is positive in cases where the reactive power flow flows from the adjoining power system 2 into the to-be-controlled power system 1, and the value $Q_{Mji}$ is negative in cases where the reactive power flow flows from the to-be-controlled power system 1 into the adjoining power system 2.

Thereafter, a required value $Q_{ARi}$ of a reactive power in the to-be-controlled power system 1 is calculated in the reactive power required value calculating unit 13 according to the reactive power flow value $Q_{mji}$, the desired value $Q^*_{Mji}$ of the reactive power flow determined in the desired reactive power value determining unit 12, the measured voltage value $V_i$ of the bus 5 of the to-be-controlled power system 1 and the desired voltage value $V_{i0}$ of the bus 5 of the to-be-controlled power system 1 (step ST4). The reactive power required value $Q_{ARi}$ is obtained according to an equation (3):

$$Q_{ARi}=Q_{Mji}-Q^*_{Mji}+K(V_i-V_{i0}) \quad (3)$$

where the symbol K denotes a power-reactive power characteristic coefficient (hereinafter called a control constant).

The first term $Q_{Mji}-Q^*_{Mji}$ of the equation (3) denotes a surplus/shortage reactive power flow at the boundary point 4 for the desired reactive power flow value $Q^*_{Mji}$, which is required to maintain the measured voltage value $V_i$ of the bus 5 of the to-be-controlled power system 1 to the desired voltage value $V_{i0}$, in cases where the measured voltage value $V_j$ of the bus 6 of the adjoining power system 2 agrees with the desired voltage value $V_{j0}$ of the bus 6. That is, a positive value of the first term denotes a surplus reactive power flow, and a negative value of the first term denotes a shortage reactive power flow.

The second term $K(V_i-V_{i0})$ of the equation (3) denotes a surplus/shortage reactive power of the to-be-controlled power system 1 resulting from a deviation value $(V_i-V_{i0})$ of the measured voltage value $V_i$ of the bus 5 from the desired voltage value $V_{i0}$ of the bus 5 and is obtained by multiplying the deviation value $(V_i-V_{i0})$ by the control constant K. That is, a positive value of the second term denotes a surplus reactive power, and a negative value of the second term denotes a shortage reactive power. Therefore, the equation (3) composed of the first and second terms indicates a reactive power to be reduced or supplemented in the to-be-controlled power system 1 to be controlled.

Therefore, the control constant K of the second term of the equation (3) can be determined in cases where the relationship between a reactive power fluctuation and a voltage fluctuation at the voltage measuring point (that is, the bus 5 of the to-be-controlled power system 1) is set, and the supplementary/reducing reactive power resulting from the voltage deviation value can be obtained according to the second term of the equation (3). In this case, the control constant K is appropriately set while considering a short circuit capacity at the voltage measuring point, the relationship between the to-be-controlled power system 1 and the adjoining power system 2 and an importance degree of the voltage maintenance.

Thereafter, when the reactive power required value $Q_{ARi}$ is calculated in the reactive power required value calculating unit 13, one or more control apparatuses to be operated are selected in the control apparatus controlling unit 14 from all voltage/reactive power control apparatuses existing in the to-be-controlled power system 1 according to the reactive power required value $Q_{ARi}$ (step ST5), operation conditions (for example, an operation time period and an operation degree) of each selected control apparatus are determined according to the reactive power required value $Q_{ARi}$ (step ST6), and an operation instruction indicating the operation conditions is output to each selected control apparatus to control operations of the selected control apparatus (step ST7). Therefore, the voltage of the bus 5 of the to-be-controlled system 1 is adjusted by the selected control apparatuses to make the reactive power required value $Q_{ARi}$ agree with a zero value.

For example, in cases where condensers and reactors exist in the to-be-controlled power system 1 as a plurality of voltage/reactive power control apparatuses, one control apparatus having a reactive power capacity nearest to the reactive power required value $Q_{ARi}$ of the to-be-controlled power system 1 is selected from the voltage/reactive power control apparatuses, an operation instruction or an operation stop instruction is sent to the selected control apparatus, and an operation of the selected control apparatus is started or stopped according to the operation instruction or the operation stop instruction to set a difference between the voltage of the bus 5 of the to-be-controlled power system 1 and the desired voltage $V_{io}$ of the to-be-controlled power system 1 and a difference between the reactive power flow $Q_{Mji}$ flowing into the to-be-controlled power system 1 and the desired reactive power flow value $Q^*_{Mji}$ of the to-be-controlled power system 1 within a prescribed allowed range. In detail, in cases where the voltage of the bus 5 is increased by the selected control apparatus, the value $Q_{Mji}$ of the reactive power flow at the boundary point 4 of the interconnection line 3 is decreased to decrease the reactive power required value $Q_{ARi}$, and the measured voltage value at the bus 5 is increased to increase the reactive power required value $Q_{ARi}$. In contrast, in cases where the voltage of the bus 5 is decreased by the selected control apparatus, the value $Q_{Mji}$ of the reactive power flow at the boundary point 4 of the interconnection line 3 is increased to increase the reactive power required value $Q_{ARi}$, and the measured voltage value at the bus 5 is decreased to decrease the reactive power required value $Q_{ARi}$.

Thereafter, the steps ST2 to ST7 are repeated until the voltage control or the reactive power control in the to-be-controlled power system 1 is not required (step ST8).

Accordingly, because the reactive power required value $Q_{ARi}$ of the to-be-controlled power system 1 is calculated according to the effective power flow $P_{ji}$ and the reactive power flow $Q_{ji}$ measured in the power flow measuring unit 11 and the desired value $Q^*_{Mji}$ of the reactive power flow determined in the desired reactive power value determining unit 12, the cooperation of the to-be-controlled power system 1 with the adjoining power system 2 can be performed by collecting locally-existing-information (for example, the measured value $P_{ji}$ of the effective power flow, the measured value $Q_{ji}$ of the reactive power flow, the measured voltage value $V_i$ of the bus 5, the desired value $V_{io}$ of the bus 5 locally existing in the to-be-controlled power system 1 and the desired voltage values $V_{jo}$ of the bus 6 locally existing in the adjoining power system 2), and a voltage fluctuation and a reactive power fluctuation in the to-be-controlled power system 1 can be immediately suppressed.

In this embodiment, condensers and reactors existing in the to-be-controlled power system 1 are used as a plurality of voltage/reactive power control apparatuses. However, it is applicable that a voltage control apparatus using a transformer tap or a power-electronics apparatus, a step-up transformer of a generator and a terminal voltage control apparatus of a generator be used as a plurality of voltage/reactive power control apparatuses. That is, any control apparatuses used to control a voltage and a reactive power are useful as a voltage/reactive power control apparatus.

Also, in this embodiment, one control apparatus having a reactive power capacity nearest to the reactive power required value $Q_{ARi}$ of the to-be-controlled power system 1 is selected. However, the present invention is not limited to this selecting method. For example, it is applicable that a plurality of control apparatuses be selected.

Next, a modification of the first embodiment is described with reference to FIG. 4 and FIG. 5.

Figure 4:
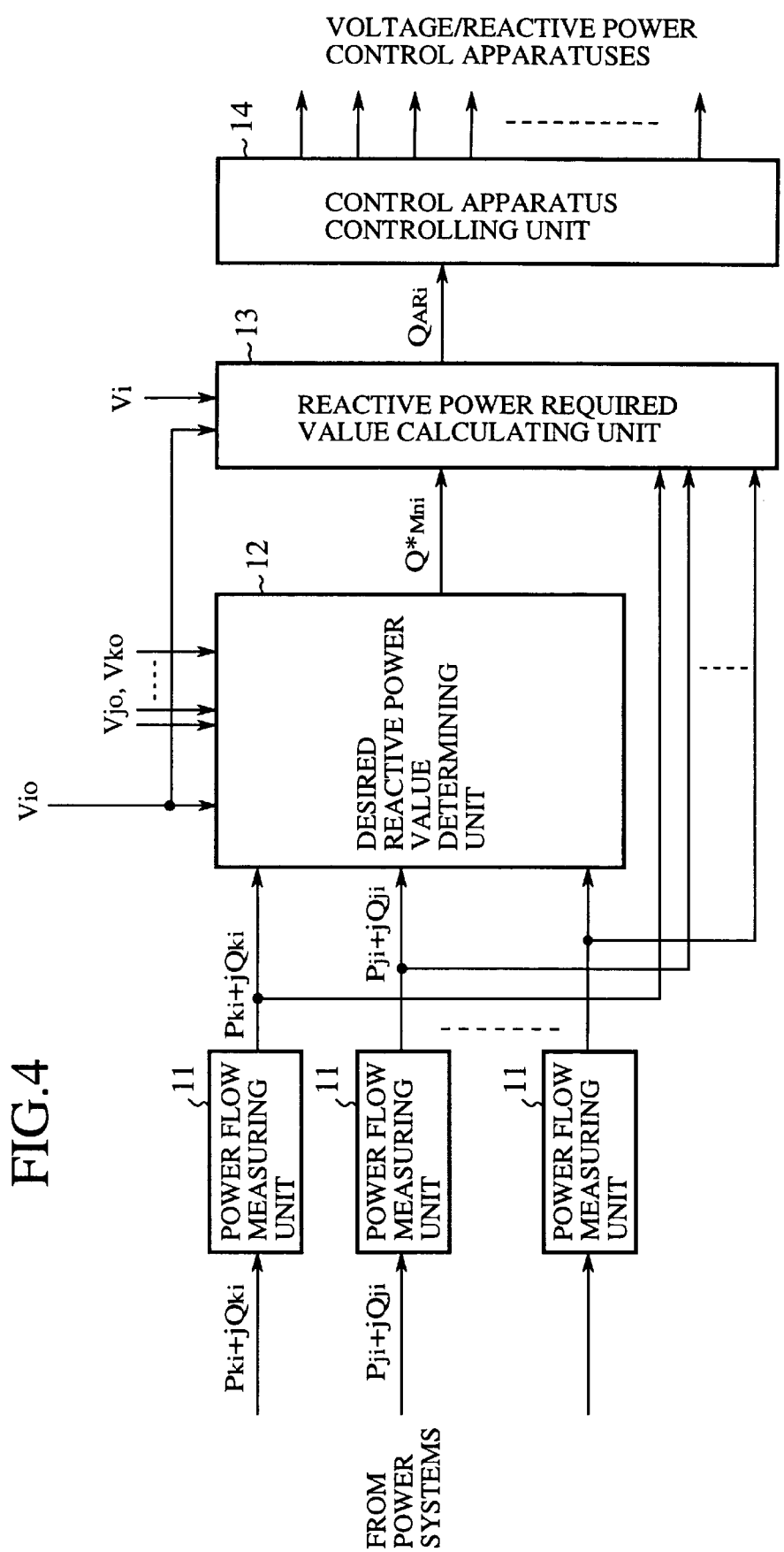
FIG. 4 is a block diagram of a power system control apparatus according to a modification of the first embodiment.

FIG. 4 is a block diagram of a power system control apparatus according to a modification of the first embodiment, and FIG. 5 is a diagram showing a power system to be controlled by the power system control apparatus shown in FIG. 4 and two adjoining power systems adjacent to the power system to be controlled.

As shown in FIG. 5, a plurality of adjoining power systems 2 represented by two adjoining power systems 2a and 2b are adjacent to the to-be-controlled power system 1 through a plurality of boundary points 4 represented by two boundary points 4a and 4b, and the adjoining power systems 2 are connected with the to-be-controlled power system 1 through a plurality of interconnection lines 3 represented by two interconnection lines 3a and 3b. A plurality of desired voltage values $V_{jO}$ (j=1,2, - - - , n) set at voltage monitoring buses 6 of the adjoining power systems 2 are represented by a desired voltage value $V_{kO}$ set at a voltage monitoring bus 6a of the adjoining power system 2a and a desired voltage value $V_{jo}$ set at a voltage monitoring bus 6b of the adjoining power system 2b.

As shown in FIG. 4, a power system control apparatus comprises:

the plurality of power flow measuring units 11, respectively corresponding to one interconnection line 3, for measuring effective power flows and reactive power flows (represented by an effective power flow $P_{ki}$ and a reactive power flow $Q_{ki}$ flowing from the adjoining power systems 2a into the to-be-controlled power system 1 and an effective power flow $P_{ji}$ and a reactive power flow $Q_{ji}$ flowing from the adjoining power systems 2b into the to-be-controlled power system 1), which flow from the adjoining power systems 2 into the to-be-controlled power system 1, at the voltage monitoring bus 5;

the desired reactive power value determining unit 12 for determining a summed value $Q^*_{Mni}$ of the reactive power flows desired at the boundary points 4 of the interconnection lines 3 according to the desired voltage value $V_{iO}$ of the bus 5, the desired voltage values (represented by $V_{jO}$ and $V_{kO}$) of the buses 6 and measured values (represented by $P_{ji}$ and $P_{ki}$) of the effective power flows and measured values (represented by $Q_{ji}$ and $Q_{ki}$) of the reactive power flows flowing into the bus 5 of the to-be-controlled power system 1;

the reactive power required value calculating unit 13 for calculating a reactive power required value $Q_{ARi}$ of the to-be-controlled power system 1 according to the desired value $Q^*_{Mni}$ of the reactive power flows determined in the desired reactive power value determining unit 12, the effective power flows and the reactive power flows measured in the power flow measuring unit 11, the measured voltage value $V_i$ of the bus 5 of the to-be-controlled power system 1 and the desired voltage value $V_{i0}$ of the bus 5 of the to-be-controlled power system 1; and the control apparatus controlling unit 14.

In this modification, a desired summed value $Q^*_{Mni}$ of the reactive power flows at the boundary points 4 of the interconnection lines 3 is determined according to an equation (4a):

$$Q^*_{Mni} = \sum_{j=1}^{n} \{R_{ij}/(R_{ij}^2 + X_{ij}^2) * (R_{ij}Q_{ji} - X_{ij}P_{ji}) + \quad (4a)$$

$$X_{ij}/(2(R_{ij}^2 + X_{ij}^2)) * (V_{i0}^2 - V_{j0}^2)\}$$

where $Z_{ij}=R_{ij}+j\,X_{ij}$ (j=1,2, - - - , n) indicates an impedance of the interconnection line 3 connecting the to-be-controlled power system i and each adjoining power system j.

A summed value $Q_{Mni}$ of reactive power flows at the boundary points 4 of the interconnection lines 3 is calculated according to an equation (4b) in the reactive power required value calculating unit 13.

$$Q_{Mni} = \sum_{j=1}^{n} \{Q_{ji} + X_{ij}(P_{ji}^2 + Q_{ji}^2)/(2V_i^2)\} \quad (4b)$$

The reactive power required value $Q_{ARi}$ of the to-be-controlled power system 1 is obtained according to an equation (4c).

$$Q_{ARi}=Q_{Mni}-Q^*_{Mni}+K(V_i-V_{i0}) \quad (4c)$$

Also, in another modification of the first embodiment, as shown in FIG. 6, it is applicable that a plurality of voltage monitoring buses 5 represented by two buses 5a and 5b be arranged in the to-be-controlled power system 1.

Figure 7:
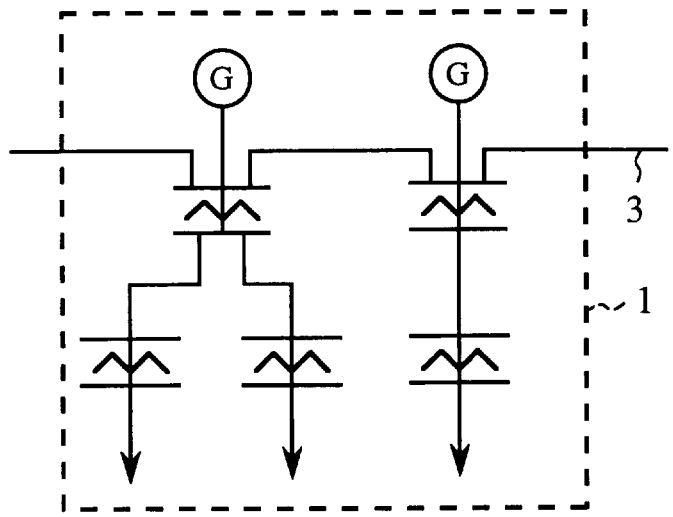
FIG. 7 is a diagram showing a power system to be controlled according to another modification of the first embodiment.
Figure 8:
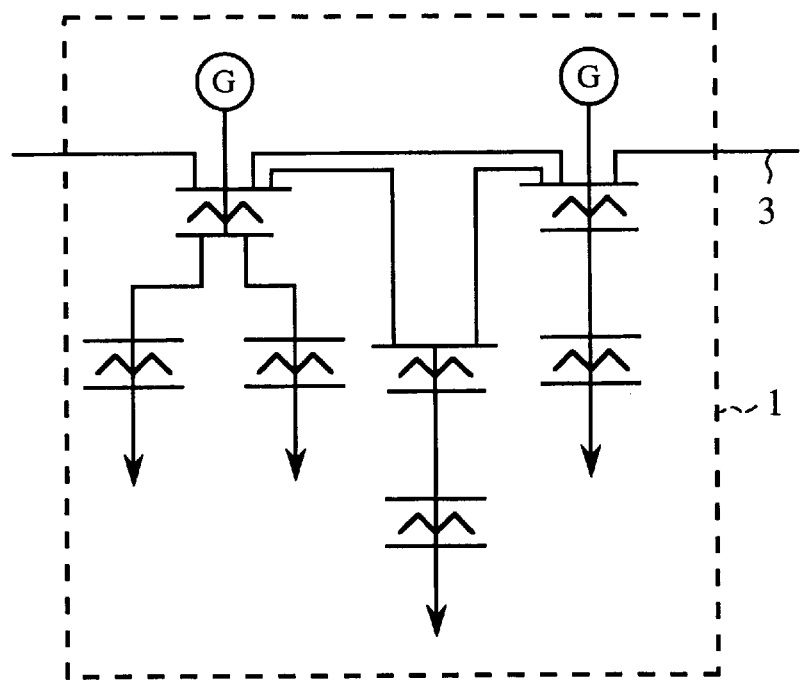
FIG. 8 is a diagram showing a power system to be controlled according to another modification of the first embodiment.

Also, in another modification of the first embodiment, as shown in FIG. 7, it is applicable that a plurality of voltage monitoring buses be arranged in series. Also, as shown in FIG. 8, it is applicable that a plurality of voltage monitoring buses be arranged in a loop shape or a mesh shape.

Figure 9:
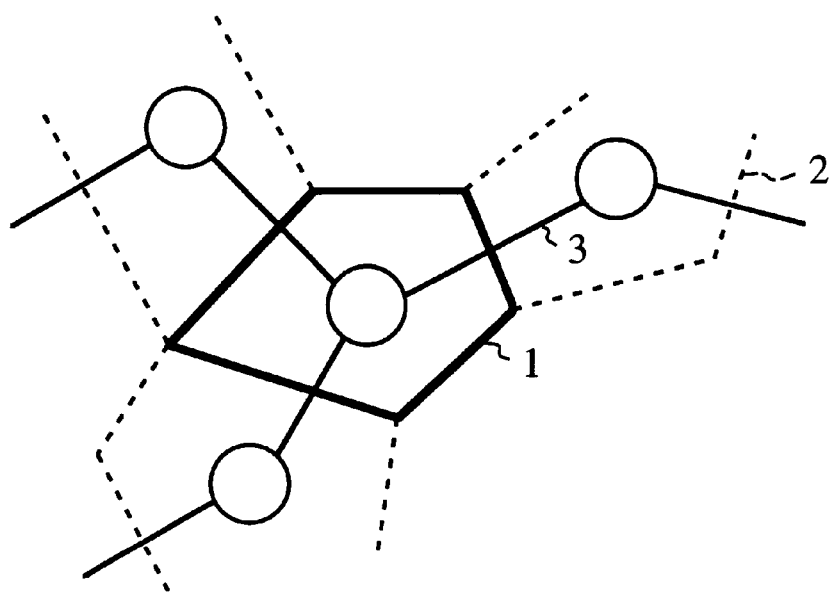
FIG. 9 is a diagram showing a power system to be controlled and a plurality of adjoining power systems adjacent to the power system to be controlled according to another modification of the first embodiment.
Figure 10:
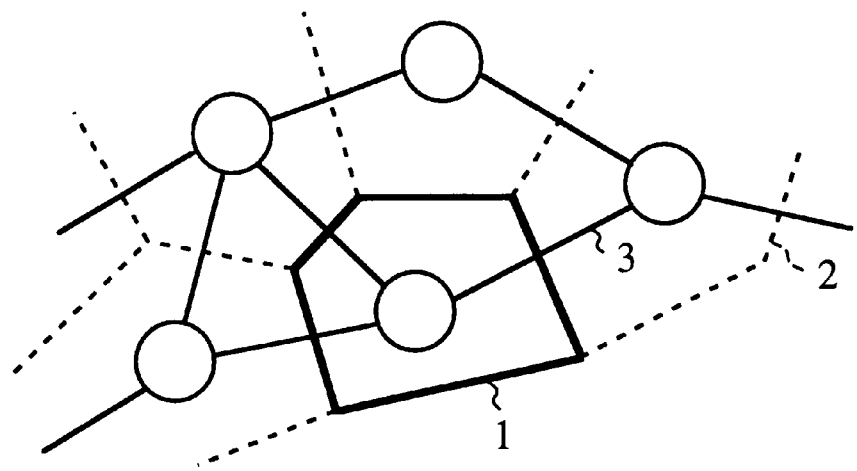
FIG. 10 is a diagram showing a power system to be controlled and a plurality of adjoining power systems adjacent to the power system to be controlled according to another modification of the first embodiment.

Also, in another modification of the first embodiment, as shown in FIG. 9, it is applicable that the to-be-controlled power system 1 to be controlled be radially connected with a plurality of adjoining power systems 2. Also, as shown in FIG. 10, it is applicable that the to-be-controlled power system 1 be connected with a plurality of adjoining power systems 2 in a loop shape or a mesh shape.

EMBODIMENT 2

Figure 11:
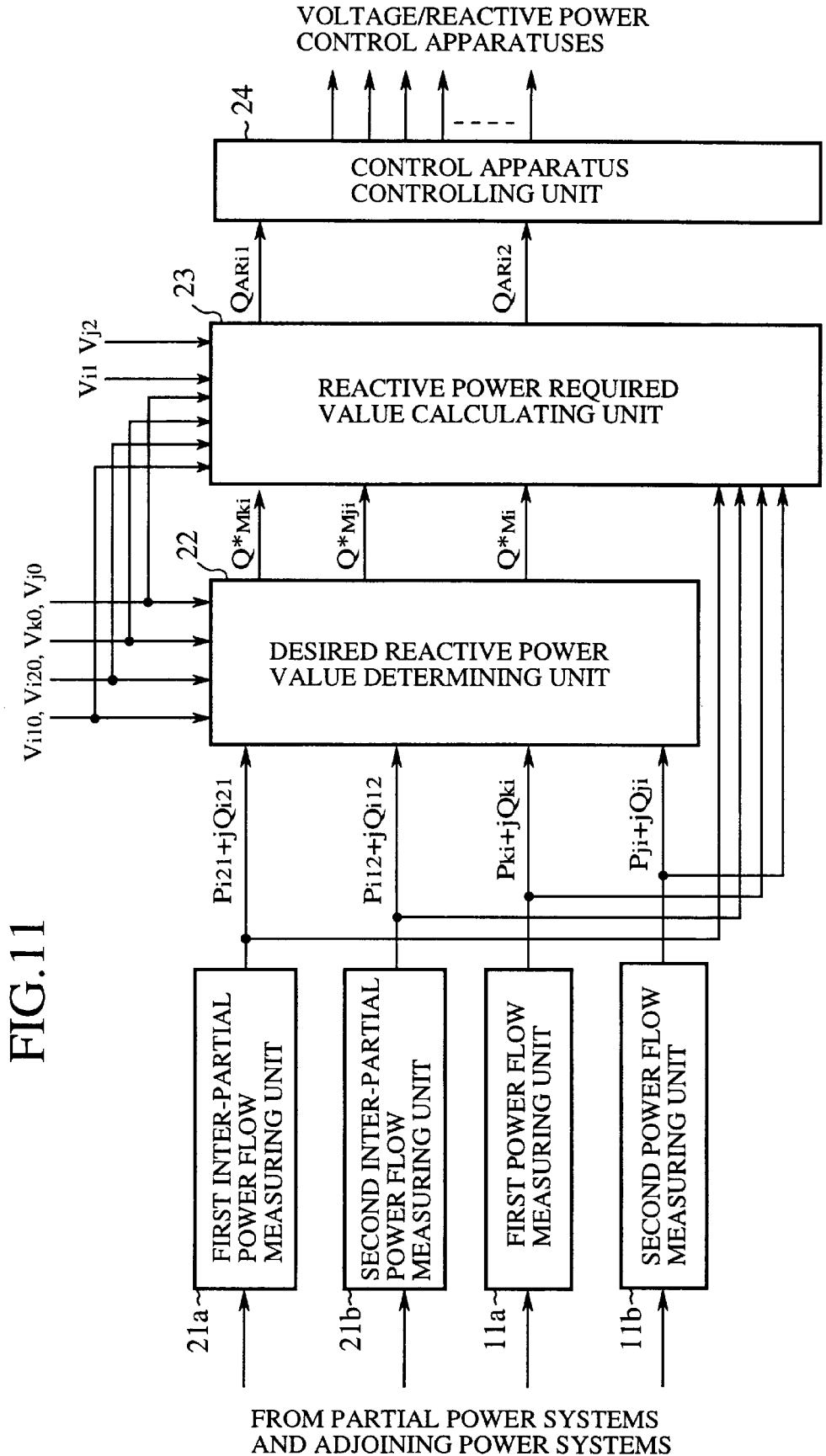
FIG. 11 is a block diagram of a power system control apparatus according to a second embodiment of the present invention.
Figure 12:
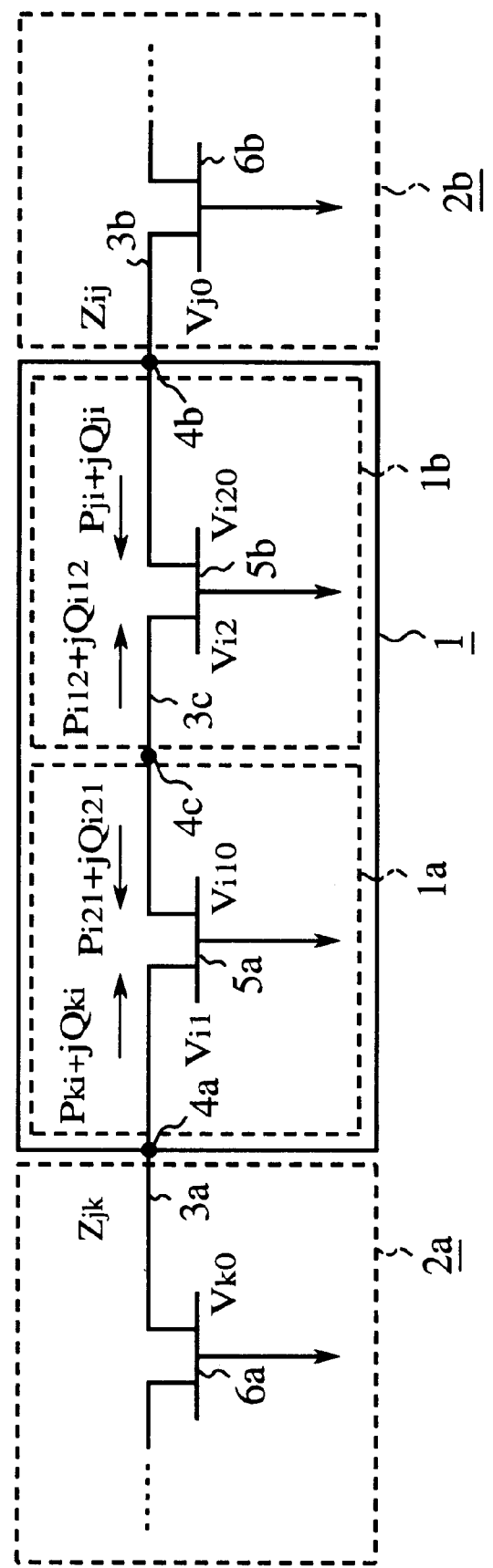
FIG. 12 is a diagram showing two partial power systems composing a power system to be controlled by the power system control apparatus shown in FIG. 11 and two adjoining power systems adjacent to the power system to be controlled.

FIG. 11 is a block diagram of a power system control apparatus according to a second embodiment of the present invention, and FIG. 12 is a diagram showing two partial power systems composing a to-be-controlled power system by the power system control apparatus shown in FIG. 11 and two adjoining power systems adjacent to the to-be-controlled power system.

As shown in FIG. 12, a to-be-controlled power system 1 comprises a first partial power system 1a and a second partial power system 1b connected with each other through an interconnection line 3c. The first partial power system 1a is adjacent to a first adjoining power system 2a through an interconnection line 3a, and the second partial power system 1b is adjacent to a second adjoining power system 2b through an interconnection line 3b.

As shown in FIG. 11, a power system control apparatus comprises:

a first power flow measuring unit 11a, functioning as a flow measuring means, for measuring an effective power flow $P_{ki}$ and a reactive power flow $Q_{ki}$, which flow from the adjoining power system 2a into the first partial power system 1a, at the bus 5a of the first partial power system 1a;

a second power flow measuring unit 11b, functioning as the flow measuring means, for measuring an effective power flow $P_{ji}$ and a reactive power flow $Q_{ji}$, which flow from the adjoining power system 2b into the second partial power system 1b, at the bus 5b of the second partial power system 1b;

a first inter-partial system power flow measuring unit 21a, functioning as the flow measuring means, for measuring an effective power flow $P_{i21}$ and the reactive power flow $Q_{i21}$, which flow from the second partial power system 1b into the first partial power system 1a, at the bus 5a;

a second inter-partial system power flow measuring unit 21b, functioning as the flow measuring means, for measuring an effective power flow $P_{i12}$ and a reactive power flow $Q_{i12}$, which flow from the first partial power system 1a into the second partial power system 1b, at the bus 5b;

a desired reactive power value determining unit 22, functioning as a desired value determining means, for determining a value $Q^*_{Mki}$ of the reactive power flow desired at a boundary point 4a of the interconnection line 3a according to the desired voltage values $V_{k0}$ and $V_{i10}$ of the buses 6a and 5a and the effective power flow $P_{ki}$ and the reactive power flow $Q_{ki}$ measured in the first power flow measuring unit 11a, determining a value $Q^*_{Mji}$ of the reactive power flow desired at a boundary point 4b of the interconnection line 3b according to the desired voltage values $V_{j0}$ and $V_{i20}$ of the buses 6b and 5b and the effective power flow $P_{ji}$ and the reactive power flow $Q_{ji}$ measured in the second power flow measuring unit 11b, and determining a value $Q^*_{Mi}$ of the reactive power flow desired at a boundary point 4c of the interconnection line 3c according to the desired voltage values $V_{i10}$ and $V_{i20}$ of the buses 5a and 5b and the effective power flow $P_{i21}$ (or $P_{i12}$) and the reactive power flow $Q_{i21}$ (or $Q_{i12}$) measured in the first inter-partial system power flow measuring unit 21a (or the second inter-partial system power flow measuring unit 21b);

a reactive power required value calculating unit 23, functioning as a required value calculating means, for calculating a reactive power required value $Q_{ARi1}$ of the first partial power system 1a and a reactive power required value $Q_{ARi2}$ of the second partial power system 1b according to the desired values $Q_{Mki}$, $Q^*_{Mji}$ and $Q^*_{Mi}$ of the reactive power flows determined in the desired reactive power value determining unit 22, the effective power flows $P_{ki}$, $P_{ji}$, $P_{i21}$ and $P_{i12}$ and the reactive power flows $Q_{ki}$, $Q_{ji}$, $Q_{i21}$ and $Q_{i12}$ measured in the power flow measuring units 11a and 11b and the inter-partial system power flow measuring units 21a and 21b, the measured voltage values $V_{i1}$ and $V_{i2}$ of the buses 5a and 5b of the partial power systems 1a and 1b and the desired voltage values $V_{k0}$, $V_{j0}$, $V_{i10}$ and $V_{i20}$ of the buses $6a$, $6b$, $5a$ and $5b$ of the power systems $2a$, $2b$, $1a$ and $1b$; and a control apparatus controlling unit 24, functioning as a control means, for selecting one or more control apparatuses to be controlled from all voltage/reactive power control apparatuses existing in the first partial power system $1a$ according to the reactive power required value $Q_{ARi1}$ of the first partial power system $1a$ calculated in the reactive power required value calculating unit 23, selecting one or more control apparatuses to be controlled from all voltage/reactive power control apparatuses existing in the second partial power system $1b$ according to the reactive power required value $Q_{ARi2}$ of the second partial power system $1b$ calculated in the reactive power required value calculating unit 23, controlling the selected control apparatuses of the first partial power system $1a$ to adjust values $Q_{Mki}$ and $Q_{Mi}$ of reactive power flows, which flows from the adjoining power system $2a$ and the second partial power system $1b$ to the first partial power system $1a$, at the boundary points $4a$ and $4c$ to the desired values $Q^*_{Mki}$ and $Q^*_{Mi}$ of the reactive power flows determined in the desired reactive power value determining unit 22 and to adjust the measured voltage value $V_{i1}$ of the bus $5a$ to the desired voltage value $V_{i10}$ according to the reactive power required value $Q_{ARi1}$ calculated in the reactive power required value calculating unit 23, and controlling the selected control apparatuses of the second partial power system $1b$ to adjust values $Q_{Mji}$ and $Q_{Mi}$ of reactive power flows, which flows from the adjoining power system $2b$ and the first partial power system $1a$ to the second partial power system $1b$, at the boundary points $4b$ and $4c$ to the desired values $Q^*_{Mji}$ and $Q^*_{Mi}$ of the reactive power flows determined in the desired reactive power value determining unit 22 and to adjust the measured voltage value $V_{i2}$ of the bus $5a$ to the desired voltage value $V_{i20}$ according to the reactive power required value $Q_{ARi2}$ calculated in the reactive power required value calculating unit 23.

In the above configuration, an operation of the power system control apparatus is described with reference to FIG. 13. In the description of the operation, a plurality of adjoining power systems 2 are represented by the adjoining power systems $2a$ and $2b$.

Figure 13:
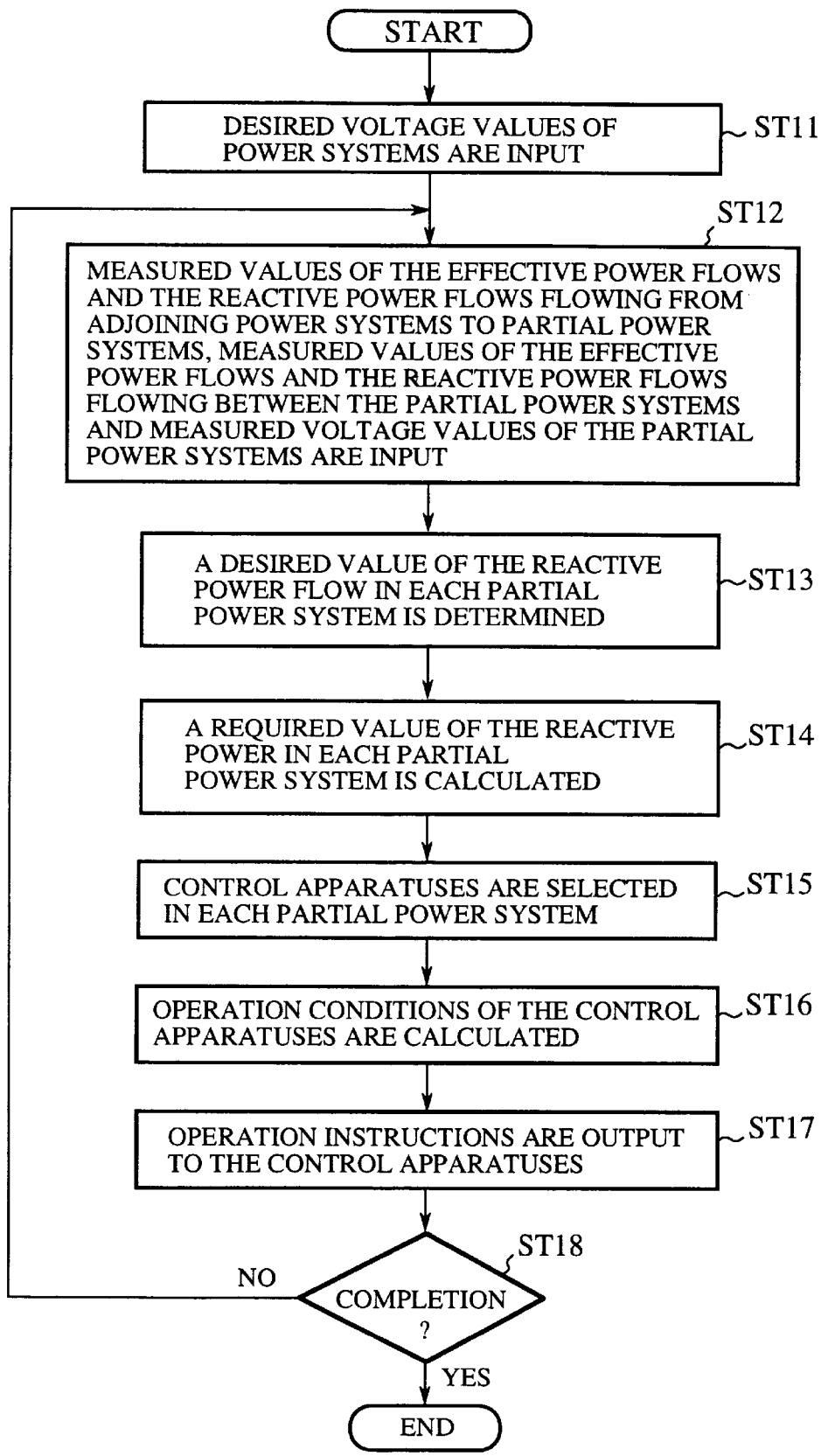
FIG. 13 is a flow chart showing a power system control method applied for the power system control apparatus shown in FIG. 11.

FIG. 13 is a flow chart showing a power system control method applied for the power system control apparatus shown in FIG. 11.

An effective power flow $P_{ki}$ and a reactive power flow $Q_{ki}$ at the bus $5a$ of the first partial power system $1a$ are measured in the first power flow measuring unit $11a$ as the power flows flowing from the adjoining power system $2a$ into the first partial power system $1a$ through the interconnection line $3a$, an effective power flow $P_{ji}$ and a reactive power flow $Q_{ji}$ at the bus $5b$ of the second partial power system $1b$ are measured in the second power flow measuring unit $11b$ as the power flows flowing from the adjoining power system $2b$ into the second partial power system $1b$ through the interconnection line $3b$, an effective power flow $P_{i21}$ and a reactive power flow $Q_{i21}$ at the bus $5a$ of the first partial power system $1a$ are measured in the first inter-partial system power flow measuring unit $21a$ as the power flows flowing from the second partial power system $1b$ into the first partial power system $1a$ through the interconnection line $3c$, and an effective power flow $P_{i12}$ and a reactive power flow $Q_{i12}$ at the bus $5b$ of the second partial power system $1b$ are measured in the second inter-partial system power flow measuring unit $21b$ as the power flows flowing from the first partial power system $1a$ into the second partial power system $1b$ through the interconnection line $3c$.

Thereafter, desired voltage values $V_{i10}$ and $V_{i20}$ of the buses $5a$ and $5b$ set in advance are input to the desired reactive power value determining unit 22 and the reactive power required value calculating unit 23, and desired voltage values $V_{k0}$ and $V_{j0}$ of the buses $6a$ and $6b$ set in advance are input to the desired reactive power value determining unit 22 (step ST11). Also, the effective power flows $P_{ki}$, $P_{ji}$, $P_{i12}$ and $P_{i12}$ and the reactive power flows $Q_{ki}$, $Q_{ji}$, $Q_{i21}$ and $Q_{i12}$ of the buses $6a$, $6b$, $5a$ and $5b$ measured in the power flow measuring units $11a$, $11b$ and the inter-partial system power flow measuring units $21a$ and $21b$ are input to the desired reactive power value determining unit 22 and the reactive power required value calculating unit 23, and measured voltage values $V_{i1}$ and $V_{i2}$ of the buses $5a$ and $5b$ of the partial power systems $1a$ and $1b$ are input to the reactive power required value calculating unit 23 (step ST12).

Thereafter, in the desired reactive power value determining unit 22, a desired value $Q_{Mki}$ of the reactive power flow flowing from the adjoining power system $2a$ into the first partial power system $1a$ through the interconnection line $3a$ is determined according to the equation (1) by using the desired voltage values $V_{k0}$ and $V_{i10}$ of the buses $6a$ and $5a$ and the effective power flow $P_{ki}$ and the reactive power flow $Q_{ki}$ of the bus $5a$, a desired value $Q^*_{Mji}$ of the reactive power flow flowing from the adjoining power system $2b$ into the second partial power system $1b$ through the interconnection line $3b$ is determined according to the equation (1) by using the desired voltage values $V_{j0}$ and $V_{i20}$ of the buses $6b$ and $5b$ and the effective power flow $P_{ji}$ and the reactive power flow $Q_{ji}$ of the bus $5b$, and a desired value $Q^*_{Mi}$ of the reactive power flow flowing from the second partial power system $1b$ into the first partial power system $1a$ (or from the first partial power system $1a$ into the second partial power system $1b$) through the interconnection line $3c$ is determined according to the equation (1) by using the desired voltage values $V_{i20}$ and $V_{i10}$ of the buses $5b$ and $5a$ and the effective power flow $P_{i21}$ (or $P_{i12}$) and the reactive power flow $Q_{i21}$ (or $Q_{i12}$) of the bus $5a$ (or the bus $5b$) (step ST13). In the calculation of the desired values $Q^*_{Mki}$, the first partial power system $1a$ is regarded as the to-be-controlled power system in the equation (1). In the calculation of the desired values $Q^*_{Mji}$, the second partial power system $1b$ is regarded as the to-be-controlled power system in the equation (1). In the calculation of the desired values $Q^*_{Mi}$, the second partial power system $1b$ (or the first partial power system $1a$) is regarded as the adjoining power system, and the first partial power system $1a$ (or the second partial power system $1b$) is regarded as the to-be-controlled power system in the equation (1).

Thereafter, when the desired values $Q_{Mki}$, $Q^*_{Mji}$ and $Q^*_{Mi}$ of the reactive power flows at the boundary points $4a$, $4b$ and $4c$ of the interconnection lines $3a$, $3b$ and $3c$ are determined in the desired reactive power value determining unit 22, a reactive power required value $Q_{ARi1}$ of the first partial power system $1a$ is calculated in the reactive power required value calculating unit 23 according to equations (5a), (5c) and (6a) by using the desired values $Q^*_{Mki}$ and $Q^*_{Mi}$ of the reactive power flows determined in the desired reactive power value determining unit 22, the measured voltage value $V_{i1}$ of the bus $5a$ of the first partial power system $1a$ and the desired voltage value $V_{i10}$ of the bus $5a$ of the first partial power system $1a$, and a reactive power required value $Q_{ARi2}$ of the second partial power system $1b$ is calculated in the reactive power required value calculating unit 23 according to equations (5b), (5c) and (6b) by using the desired values $Q^*_{Mji}$ and $Q^*_{Mi}$ of the reactive power flows determined in the desired reactive power value determining unit 22, the measured voltage value $V_{i2}$ of the bus 5b of the second partial power system 1b and the desired voltage value $V_{i20}$ of the bus 5b of the first partial power system 1b (step ST14):

$$Q^*_{Mki} = Q_{ki} + X_{ik}(P^2_{ki} + Q^2_{ki})/(2V^2_{i1}) \tag{5a}$$

$$Q_{Mji} = Q_{ji} + X_{ij}(P^2_{ji} + Q^2_{ji})/(2V^2_{i2}) \tag{5b}$$

$$Q_{Mi} = Q_{i21} + X_{i12}(P^2_{i21} + Q^2_{i21})/(2V^2_{i1}) \tag{5c}$$

$$Q_{ARi1} = Q_{Mki} + Q_{Mi} - (Q^*_{Mki} + (Q^*_{Mi}) + K(V_{i1} - V_{i10}) \tag{6a}$$

$$Q_{ARi2} = Q_{Mji} - Q_{Mi} - (Q^*_{Mji} - (Q^*_{Mi}) + K(V_{i2} - V_{i20}) \tag{6b}$$

where the symbol $X_{ik}$ denotes a reactance of the interconnection line 3a, the symbol $X_{i12}$ denotes a reactance of the interconnection line 3c, the symbol $X_{ij}$ denotes a reactance of the interconnection line 3b, the symbol $Q^*_{Mki}$ denotes a value of a reactive power flow, which flows from the adjoining power system 2a to the first partial power system 1a, at the boundary point 4a, the symbol $Q_{Mji}$ denotes a value of a reactive power flow, which flows from the adjoining power system 2b to the second partial power system 1b, at the boundary point 4b, and the symbol $Q_{Mi}$ denotes a value of a reactive power flow, which flows from the second partial power system 1b to the first partial power system 1a, at the boundary point 4c.

Thereafter, when the reactive power required values $Q_{ARi1}$ and $Q_{ARi2}$ are calculated in the reactive power required value calculating unit 23, one or more first control apparatuses are selected in the control apparatus controlling unit 24 from all voltage/reactive power control apparatuses existing in the first partial power system 1a according to the reactive power required value $Q_{ARi1}$ (step ST15), one or more second control apparatuses are selected in the control apparatus controlling unit 24 from all voltage/reactive power control apparatuses existing in the second partial power system 1b according to the reactive power required value $Q_{ARi2}$ (step ST15), operation conditions (for example, an operation time period and an operation degree) of each first control apparatus are calculated according to the reactive power required value $Q_{ARi1}$ (step ST16), operation conditions of each second control apparatus are calculated according to the reactive power required value $Q_{ARi2}$ (step ST16), operation instructions indicating the operation conditions are output to the first control apparatuses to control operations of the first control apparatuses (step ST17), and operation instructions indicating the operation conditions are output to the second control apparatuses to control operations of the second control apparatuses (step ST17).

Therefore, the voltage of the bus 5a of the first partial system 1a is adjusted by the first control apparatuses to make the reactive power required value $Q_{ARi1}$ agree with a zero value, and the voltage of the bus 5b of the second partial system 1b is adjusted by the second control apparatuses to make the reactive power required value $Q_{ARi2}$ agree with a zero value. For example, in cases where the voltage of the bus 5a is increased by the first control apparatuses, the values $Q_{Mki}$ and $Q_{Mi}$ of the reactive power flows at the boundary points 4a and 4c of the interconnection lines 3a and 3c are decreased to decrease the reactive power required value $Q_{ARi1}$, and the measured voltage value $V_{i1}$ is increased to increase the reactive power required value $Q_{ARi1}$. In contrast, in cases where the voltage of the bus 5a is decreased by the first control apparatuses, the values $Q_{Mki}$ and $Q_{Mi}$ of the reactive power flows at the boundary points 4a and 4c of the interconnection lines 3a and 3c are increased to increase the reactive power required value $Q_{ARi1}$, and the measured voltage value $V_{i1}$ is decreased to decrease the reactive power required value $Q_{ARi1}$.

Thereafter, the steps ST12 to ST17 are repeated until the voltage control or the reactive power control of the partial power systems 1a and 1b is not required (step ST18).

Accordingly, because the reactive power required values $Q_{ARi1}$ and $Q_{ARi2}$ of the partial power systems 1a and 1b are calculated according to the effective power flows and the reactive power flows measured in the power flow measuring unit 21 and the desired values of the reactive power flows determined in the desired reactive power value determining unit 22, even though one to-be-controlled power system 1 is divided into a plurality of partial power systems, the cooperation of the partial power systems 1a and 1b with the adjoining power systems 2a and 2b can be performed by collecting locally-existing-information (for example, the measured values $P_{ki}$, $P_{ji}$ and $P_{i21}$ (or $P_{i12}$) of the effective power flows, the measured values $Q_{ki}$, $Q_{ji}$ and $Q_{i21}$ (or $Q_{i2}$) of the reactive power flow, the measured voltage values $V_{i1}$ and $V_{i2}$ and the desired voltage values $V_{i10}$ and $V_{i20}$ at the buses 5a and 5b locally existing in the partial power systems 1a and 1b, and the desired voltage values $V_{j0}$ and $V_{k0}$ at the buses 6a and 6b locally existing in the adjoining power systems 2a and 2b), and a voltage fluctuation and a reactive power fluctuation at the partial power systems 1a and 1b can be immediately suppressed.

Figure 14:
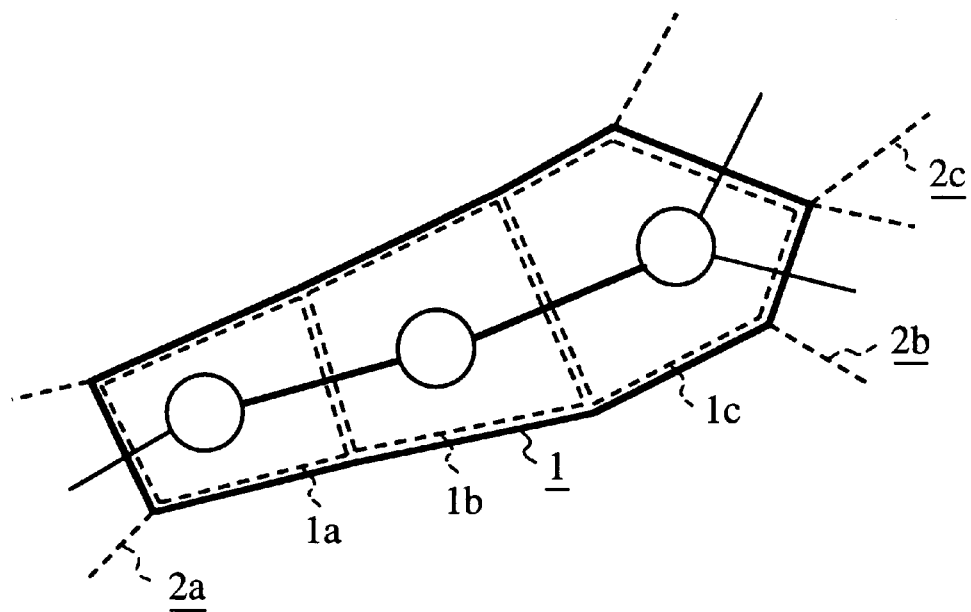
FIG. 14 is a block diagram showing three partial power systems composing a power system to be controlled according to a modification of the second embodiment.
Figure 15:
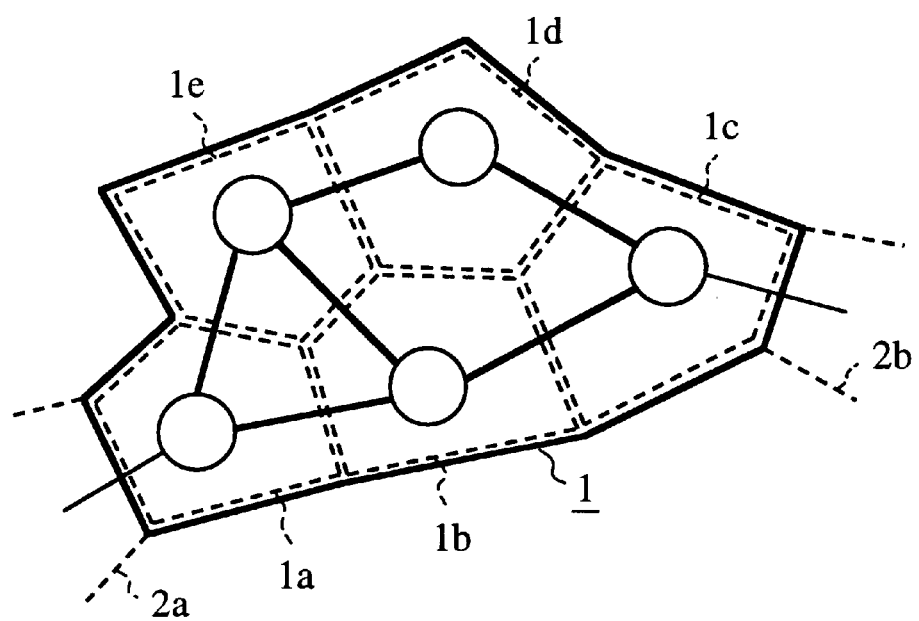
FIG. 15 is a block diagram showing a plurality of partial power systems composing a power system to be controlled according to another modification of the second embodiment.

In this embodiment, the to-be-controlled power system 1 is divided into the first partial power system 1a and the second partial power system 1b. However, the present invention is not limited to this division of the to-be-controlled be-controlled power system 1, and it is applicable that the to-be-controlled power system 1 be divided into three partial power systems or more. In this case, as shown in FIG. 14, it is applicable that the three or more partial power systems 1a, 1b and 1c adjacent to a plurality of adjoining power systems 2a, 2b and 2c be arranged in series. Also, as shown in FIG. 15, it is applicable that the three or more partial power systems 1a to 1e be arranged in a loop shape or a mesh shape.

Also, in this embodiment, the reactive power required value calculating unit 23 and the control apparatus controlling unit 24 are respectively arranged for all partial power systems obtained by dividing the to-be-controlled power system 1. However, the present invention is not limited to this arrangement. For example, it is applicable that the reactive power required value calculating unit 23 and the control apparatus controlling unit 24 be respectively arranged for each partial power system or for every two or more partial power systems. Therefore, the number of reactive power required value calculating units 23 or the number of control apparatus controlling units 24 are not limited.

Also, it is applicable that the operations of the reactive power required value calculating unit 23 and the control apparatus controlling unit 24 be performed by using one computer system, or it is applicable that a plurality of computer systems respectively corresponding to one partial power system be performed in parallel.

Also, in this embodiment, the equation (1) can be applied in cases where each boundary point 4 is placed at the mid position of the corresponding interconnection line 3. However, the present invention is not limited to these boundary points. That is, the equation (1) can be revised according to the position of each boundary point 4 in the interconnection line 3.

EMBODIMENT 3

Figure 16:
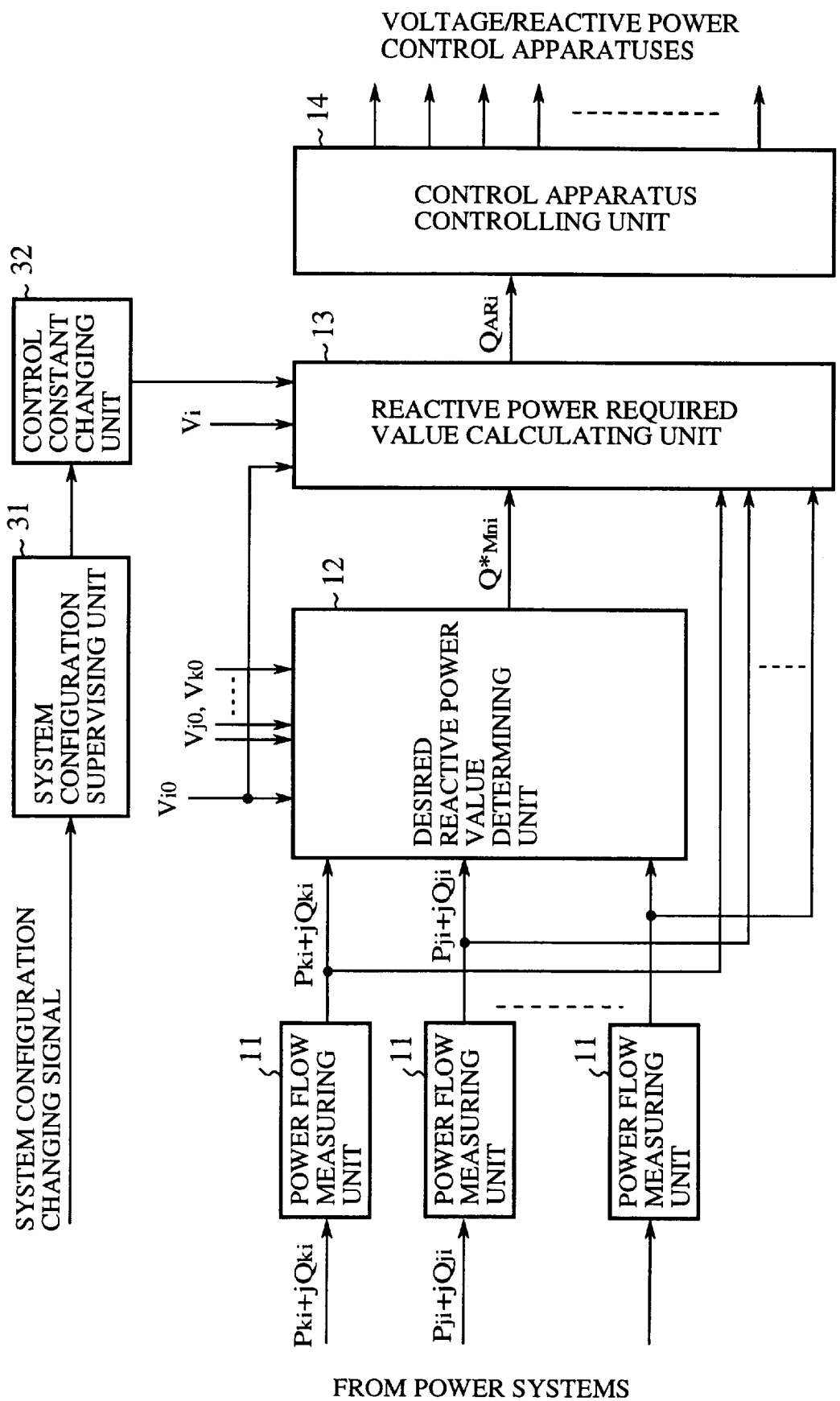
FIG. 16 is a block diagram of a power system control apparatus according to a third embodiment of the present invention.

FIG. 16 is a block diagram of a power system control apparatus according to a third embodiment of the present invention. The description of composing elements indicated by reference numerals, which are the same as those used in FIG. 1, is omitted because the composing elements of FIG. 16 are the same as or equivalent to those of FIG. 1 indicated by the same reference numerals.

As shown in FIG. 16, a power system control apparatus comprises:

the power flow measuring units 11 respectively corresponding to one interconnection line 3; the desired reactive power value determining unit 12;

a system configuration supervising unit 31, functioning as a constant value changing means, for supervising a system configuration of power systems currently operated to detect the changing of the system configuration;

a control constant changing unit 32, functioning as the constant value changing means, for changing a value of the control constant K to a new value matching with a new system configuration in cases where it is detected that the system configuration of the power systems supervised in the system configuration supervising unit 31 is changed to the new system configuration;

the reactive power required value calculating unit 13 for calculating a reactive power required value $Q_{ARi}$ of the to-be-controlled power system 1 according to the control constant K having the new value changed in the control constant changing unit 32; and the control apparatus controlling unit 14.

In the above configuration, a system configuration of power systems currently operated is always supervised in the system configuration supervising unit 31. When the system configuration is changed to a new system configuration because the operation of one power system is changed to that of another power system, the operation of a generator of one power system is started or the operation of one power system is stopped, the changing of the system configuration is detected in the system configuration supervising unit 31, and a value of the control constant K planned to be used for the calculation of the reactive power required value $Q_{ARi}$ performed in the reactive power required value calculating unit 13 is changed to a new value matching with the new system configuration in the control constant changing unit 32.

Thereafter, the reactive power required value $Q_{ARi}$ is calculated in the reactive power required value calculating unit 13 by using the control constant K having the new value.

Accordingly, even though the system configuration of the power systems currently operated is changed, because the reactive power required value $Q_{ARi}$ is calculated by using the control constant K of the new value matching with the new system configuration, a voltage fluctuation and a reactive power fluctuation occurring in the to-be-controlled power system 1 can be reliably suppressed.

In this embodiment, a value of the control constant K is changed to a new value matching with the new system configuration. However, the present invention is not limited to the changing of the value of the control constant K. For example, it is applicable that the desired voltage value $V_{i0}$ of the to-be-controlled power system 1 be changed to change the desired value $Q^*_{Mji}$ of the reactive power flow. Also, it is applicable that both the value of the control constant and the desired voltage value $V_{io}$ of the to-be-controlled power system 1 be changed.

Also, in this embodiment, the changing of the control constant value is applied for the first embodiment. However, it is applicable that the changing of the control constant value depending on the changing of the system configuration of the power systems be applied for the second embodiment.

EMBODIMENT 4

Figure 17:
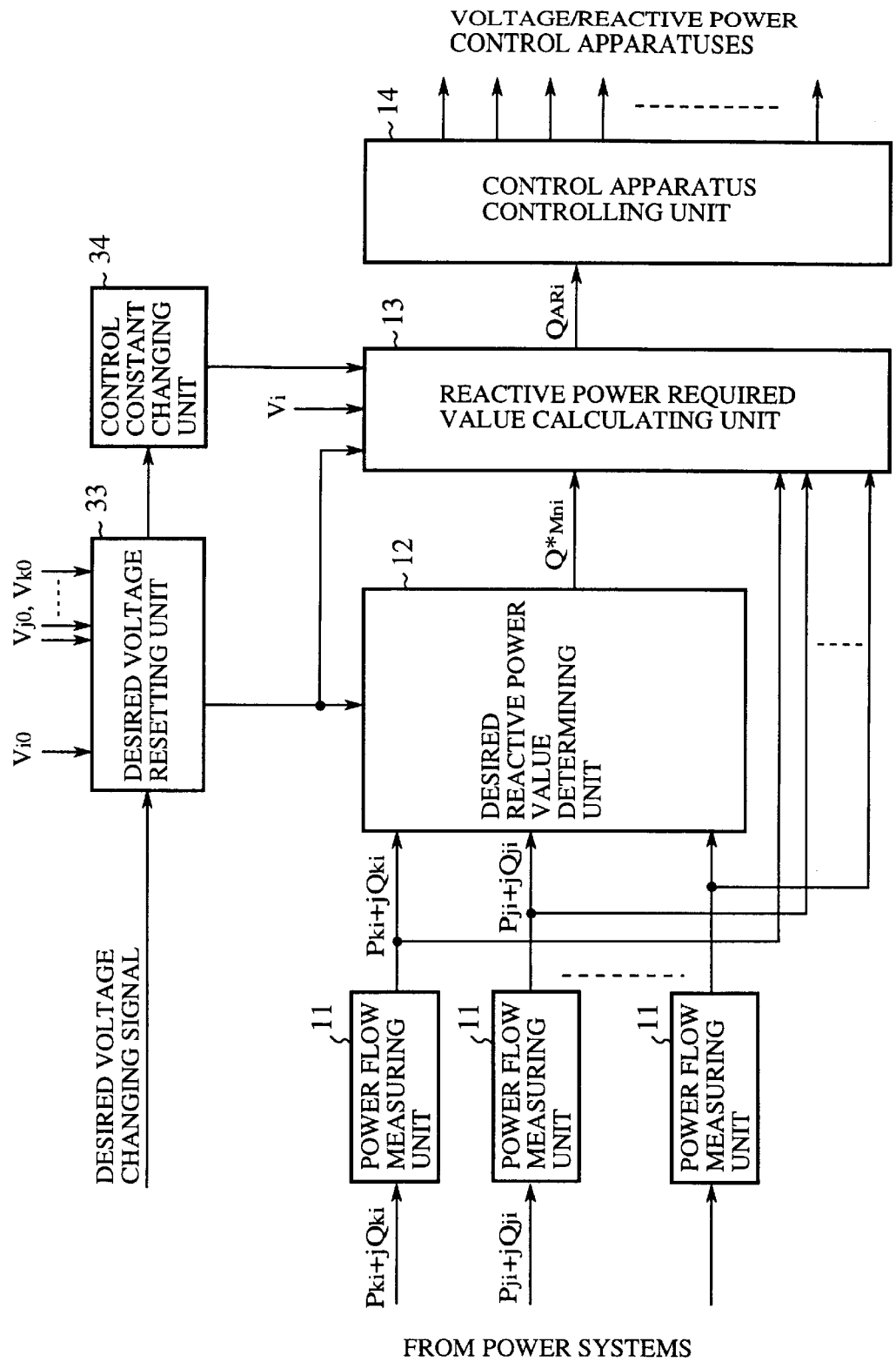
FIG. 17 is a block diagram of a power system control apparatus according to a fourth embodiment of the present invention.

FIG. 17 is a block diagram of a power system control apparatus according to a fourth embodiment of the present invention. The description of composing elements indicated by reference numerals, which are the same as those used in FIG. 1, is omitted because the composing elements of FIG. 17 are the same as or equivalent to those of FIG. 1 indicated by the same reference numerals.

As shown in FIG. 17, a power system control apparatus comprises:

the power flow measuring units 11 respectively corresponding to one interconnection line 3;

a desired voltage resetting unit 33, functioning as a constant value changing means, for resetting the desired voltage value $V_{io}$ of the to-be-controlled power system 1 and the desired voltage values $V_{jo}$ of the adjoining power systems 2 set in advance according to a desired voltage changing signal input by an operator;

a control constant changing unit 34, functioning as the constant value changing means, for changing a value of the control constant K to a new value according to a difference between a group of the desired voltage values $V_{io}$ and $V_{jo}$ set in advance and a group of the desired voltage values $V_{io}$ and $V_{jo}$ reset in the desired voltage resetting unit 33;

the desired reactive power value determining unit 12 for determining a value $Q^*_{Mji}$ of the reactive power flow according to the desired voltage values $V_{io}$ and $V_{jo}$ reset in the desired voltage resetting unit 33;

the reactive power required value calculating unit 13 for calculating a reactive power required value $Q_{ARi}$ of the to-be-controlled power system 1 according to the control constant K of the new value changed in the control constant changing unit 34 and the value $Q^*_{Mji}$ of the reactive power flow determined in the desired reactive power value determining unit 12; and the control apparatus controlling unit 14.

In the above configuration, when a load of each power system is, for example, reduced (or increased) according to an operation time, an operation season or an operation day of each week, a desired voltage changing signal indicating the lowering of the desired voltage values $V_{io}$ and $V_{jo}$ set in advance is input to the desired voltage resetting unit 33 by an operator to reset the desired voltage values $V_{io}$ and $V_{jo}$ to lower values (or higher values), and a value of the control constant K is changed to a new value in the control constant changing unit 34 according to a difference between the desired voltage values $V_{io}$ and $V_{jo}$ reset in advance and the desired voltage values $V_{io}$ and $V_{jo}$ reset in the desired voltage resetting unit 33.

Thereafter, a value $Q^*_{Mji}$ of the reactive power flow is determined in the desired reactive power value determining unit 12 according to the desired voltage values $V_{io}$ and $V_{jo}$ reset in the desired voltage resetting unit 33, and a reactive power required value $Q_{ARi}$ of the to-be-controlled power system 1 is calculated in the reactive power required value calculating unit 13 according to the control constant K of the new value and the value $Q^*_{Mji}$ of the reactive power flow.

Accordingly, even though operation conditions of the power systems 1 and 2 change, because the value $Q^*_{Mji}$ of the reactive power flow is changed with the operation conditions, the reactive power required value $Q_{ARi}$ of the to-be-controlled power system 1 can be changed with the operation conditions. Therefore, a voltage fluctuation and a reactive power fluctuation occurring in the to-be-controlled be-controlled power system 1 can be reliably suppressed.

In this embodiment, the desired voltage values $V_{io}$ and $V_{jo}$ set in advance are manually reset by the operator by inputting the desired voltage changing signal. However, the present invention is not limited to the manual operation. For example, it is applicable that the desired voltage values $V_{io}$ and $V_{jo}$ set in advance be automatically reset according to a voltage resetting schedule determined in advance, or it is applicable that the desired voltage values $V_{io}$ and $V_{jo}$ set in advance be automatically reset according to the measured values of the voltage Vi and the power flows $P_{ji}+jQ_{ji}$ or an instruction value of a stabilizing apparatus.

Also, in this embodiment, the changing of the control constant value is applied for the first embodiment. However, it is applicable that the changing of the control constant value depending on the changing of the desired voltage values $V_{io}$ and $V_{jo}$ be applied for the second embodiment.

EMBODIMENT 5

Figure 18:
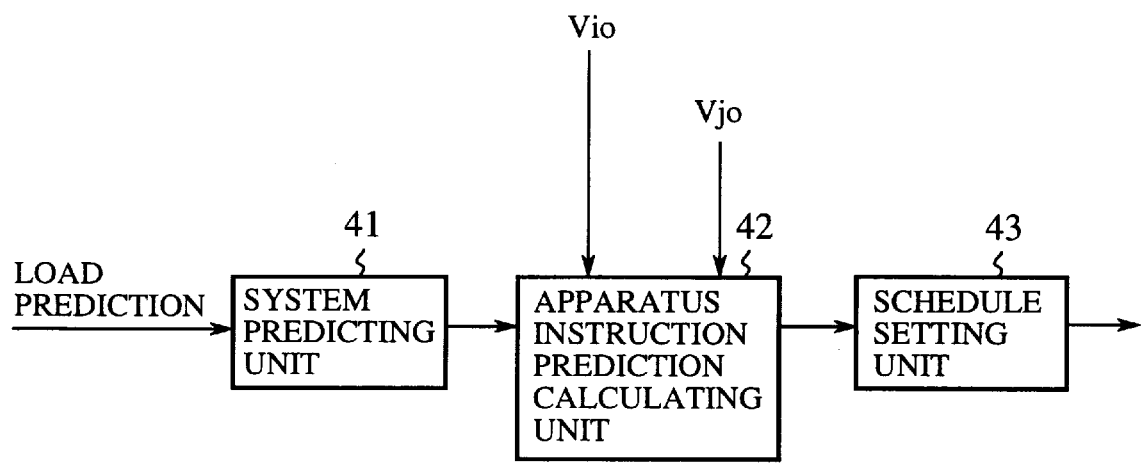
FIG. 18 is a block diagram of a power system control apparatus according to a fifth embodiment of the present invention.

FIG. 18 is a block diagram of a power system control apparatus according to a fifth embodiment of the present invention.

As shown in FIG. 18, a power system control apparatus comprises:

- a system predicting unit 41, functioning as a system predicting means, for predicting electric information, such as a voltage Vi of the to-be-controlled power system 1 and a power flow of a transmission line in the to-be-controlled power system 1, and electric information, such as a power flow $P_{ji}+jQ_{ji}$ between the to-be-controlled power system 1 and each of the adjoining power systems 2, by performing a power flow calculation according to a load prediction of the power systems 1 and 2;
- an apparatus instruction prediction calculating unit 42, functioning as an operation predicting means and made of the desired reactive power value determining unit 12 and the reactive power required value calculating unit 13, for predicting operations of voltage/reactive power control apparatuses existing in the to-be-controlled power system 1 according to the electric information predicted in the system predicting unit 41 and the desired voltage values $V_{io}$ and $V_{jo}$ set in advance; and
- a schedule setting unit 43, functioning as a schedule setting means, for setting an operation schedule (for example, an operation time period and an operation degree) of the voltage/reactive power control apparatuses according to the prediction result obtained in the apparatus instruction prediction calculating unit 42.

In the above configuration, when a load prediction of the power systems 1 and 2 (for example, a prediction value of a load fluctuation of each power system which is obtained from a load result of the power system possessed by a power company) is input to the system predicting unit 41, a generating value of a generator is calculated from the load prediction, and a power flow calculation is performed. Therefore, electric information (for example, a voltage Vi and a power flow of a transmission line) of the to-be-controlled power system 1 and electric information (for example, power flows $P_{ji}+jQ_{ji}$) between the to-be-controlled power system 1 and a group of the adjoining power systems 2 are predicted.

Thereafter, operations of voltage/reactive power control apparatuses existing in the to-be-controlled power system 1 are predicted in the apparatus instruction prediction calculating unit 42 according to the electric information, and a prediction result of the operations of the voltage/reactive power control apparatuses is output from the apparatus instruction prediction calculating unit 42 to the schedule setting unit 43. In the prediction result, an identification code, an operation time period, a type of an operation and the like are included for each voltage/reactive power control apparatus.

Thereafter, an operation schedule of the voltage/reactive power control apparatuses is set according to the prediction result in the schedule setting unit 43, so that the voltage/reactive power control apparatuses are operated according to operation conditions set in the operation schedule.

Accordingly, a voltage fluctuation and a reactive power fluctuation occurring in the to-be-controlled power system 1 can be reliably suppressed.

EMBODIMENT 6

Figure 19:
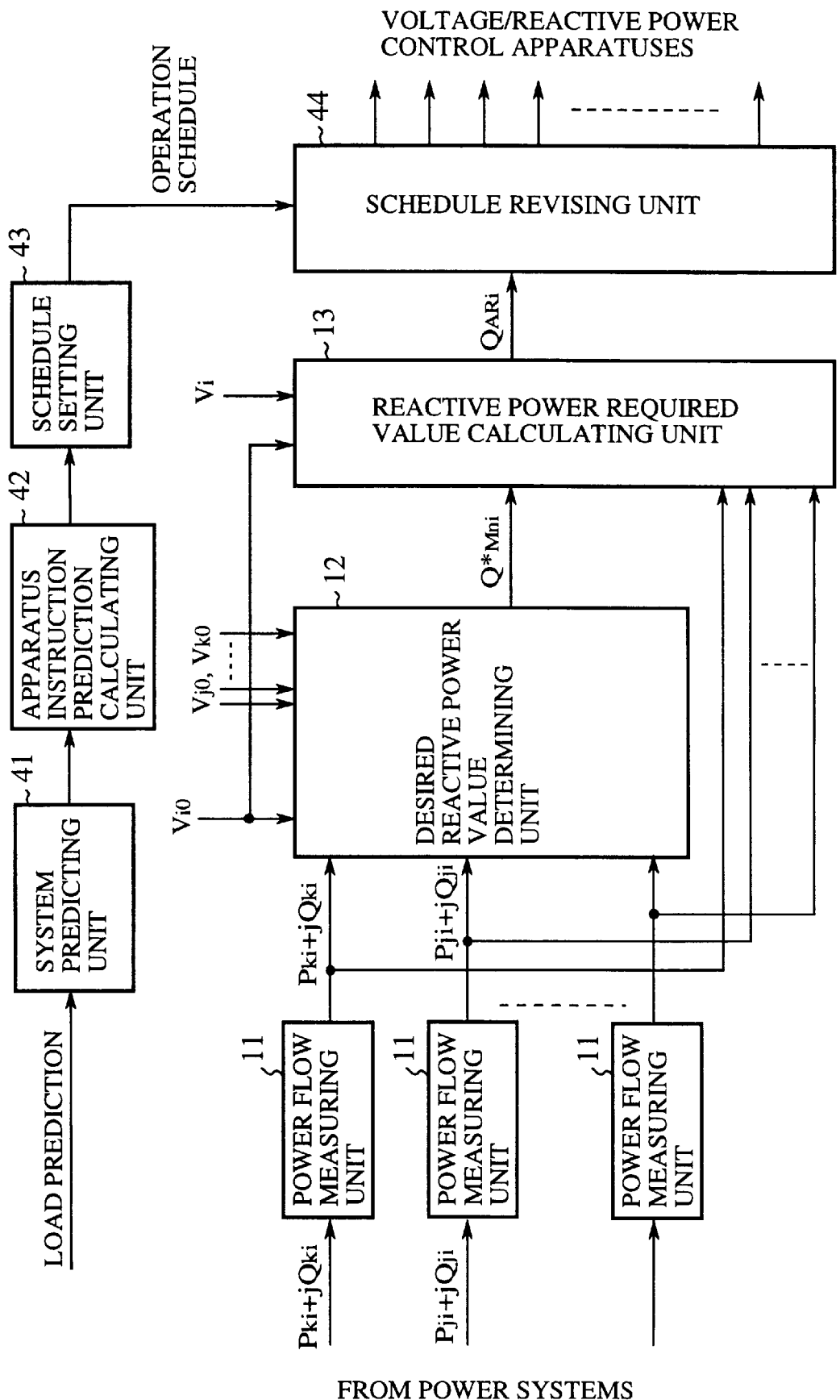
FIG. 19 is a block diagram of a power system control apparatus according to a sixth embodiment of the present invention.

FIG. 19 is a block diagram of a power system control apparatus according to a sixth embodiment of the present invention. The description of composing elements indicated by reference numerals, which are the same as those used in FIG. 1, is omitted because the composing elements of FIG. 19 are the same as or equivalent to those of FIG. 1 indicated by the same reference numerals.

As shown in FIG. 19, a power system control apparatus comprises:

- the power flow measuring units 11 respectively corresponding to one interconnection line 3; the desired reactive power value determining unit 12; the reactive power required value calculating unit 13; the control apparatus controlling unit 14; the system predicting unit 41; the apparatus instruction prediction calculating unit 42; the schedule setting unit 43; and
- a schedule revising unit 44, functioning as a schedule revising means, for changing the operation schedule set in the schedule setting unit 43 to a revised operation schedule matching with the operation conditions of the selected control apparatuses set in the apparatus controlling unit 14, in cases where the operation schedule set in the apparatus instruction prediction calculating unit 42 does not match with the operation conditions of the selected control apparatuses, and outputting operation instructions indicating operation conditions indicated by the revised operation schedule to the control apparatuses.

In the above configuration, when the operation schedule is set in the schedule setting unit 43 in the same manner as in the fifth embodiment and when the operation conditions of the selected control apparatuses are set in the apparatus controlling unit 14 in the same manner as in the first embodiment, the operation schedule is compared with the operation conditions of the selected control apparatuses set in the schedule revising unit 44.

In cases where the operation schedule matches with the operation conditions of the selected control apparatuses, the operation schedule is adopted, and the selected control apparatuses are operated according to operation conditions set in the operation schedule.

In contrast, in cases where the operation schedule does not match with the operation conditions of the selected control apparatuses, the operation schedule is changed to a revised operation schedule matching with the operation conditions of the selected control apparatuses. In this case, an operation time period and/or an operation degree of each selected control apparatus required to be changed are revised. Thereafter, the selected control apparatuses are operated according to operation conditions set in the revised operation schedule.

Accordingly, even though the load prediction is different from an actual load required for the to-be-controlled power system 1 and the adjoining power systems 2, because the operation schedule is revised to a revised operation schedule by considering the operation conditions of the selected control apparatuses set according to the actual load, the to-be-controlled power system and the adjoining power systems can be automatically controlled by the selected control apparatuses which are operated according to operation conditions set in the revised operation schedule, a voltage fluctuation and a reactive power fluctuation occurring in the to-be-controlled power system 1 can be reliably suppressed.

In this embodiment, the operation of the control apparatuses according to the operation schedule or the revised operation schedule is applied for the first embodiment. However, it is applicable that the operation of the control apparatuses according to the operation schedule or the revised operation schedule be applied for the second embodiment.

EMBODIMENT 7

Figure 20:
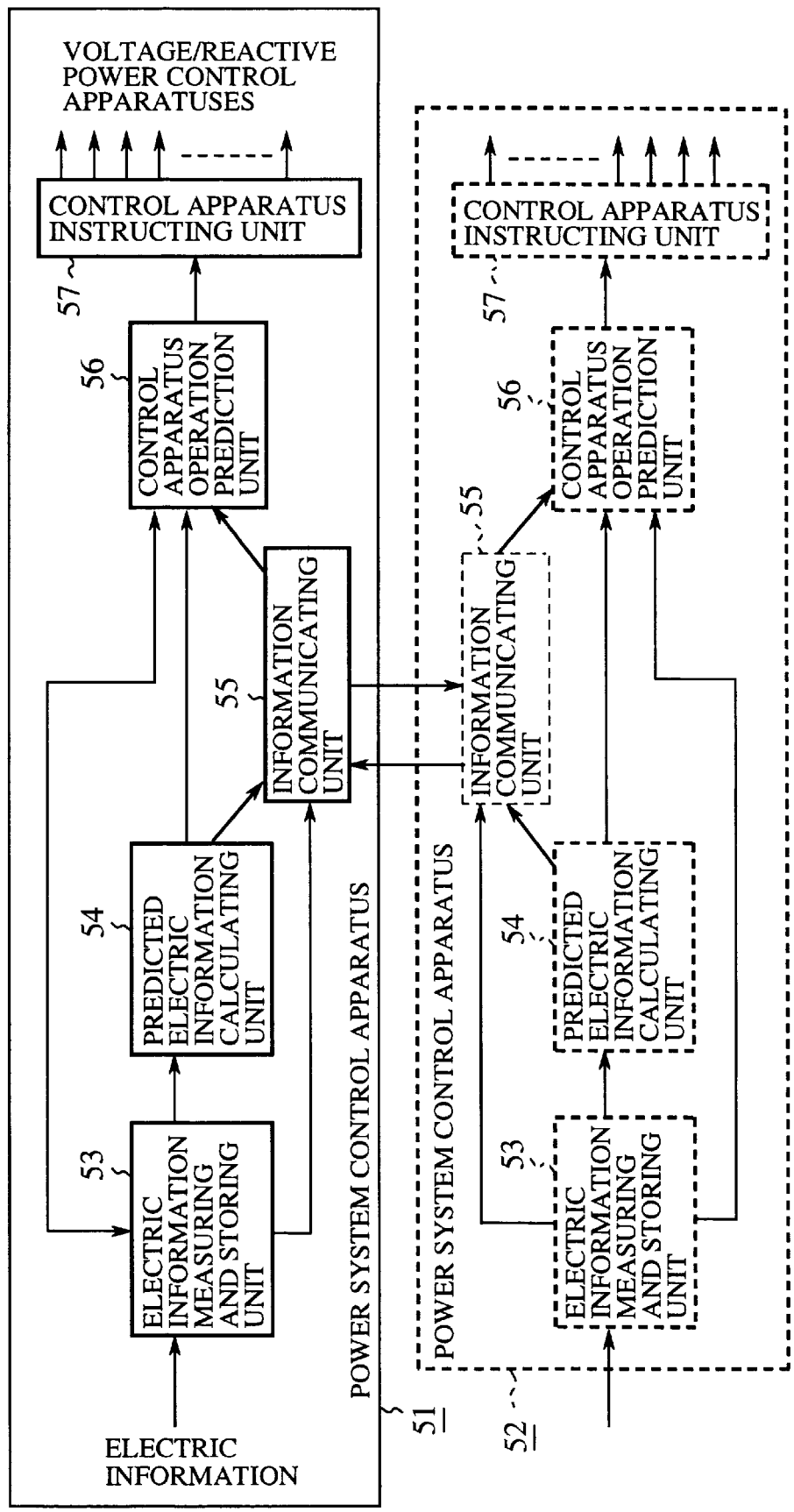
FIG. 20 is a block diagram of a power system control apparatus arranged for each power system according to a seventh embodiment of the present invention.

FIG. 20 is a block diagram of a power system control apparatus arranged for each power system according to a seventh embodiment of the present invention.

As shown in FIG. 20, a power system control apparatus 51 or 52 is arranged for each of power systems. The power system control apparatus 51 or 52 of a particular power system representing the to-be-controlled power system 1 and the adjoining power systems 2 comprises:

- an electric information measuring and storing unit 53, functioning as an electric information predicting means, for measuring electric information such as a voltage value, an effective power flow and a reactive power flow at a voltage monitoring point of the particular power system and storing the electric information;
- a predicted electric information calculating unit 54, functioning as the electric information predicting means, for calculating predicted electric information (for example, a predicted voltage value $V_{predict}$, a predicted effective power flow and a predicted reactive power flow) at the voltage monitoring point of the particular power system according to the measured electric information stored in the electric information measuring and storing unit 53;
- an information communicating unit 55, functioning as a communicating means, for receiving and transmitting the electric information of the particular power system measured in the electric information measuring and storing units 53 and the predicted electric information of the particular power system calculated in the predicted electric value calculating units 54 from/to another or other power systems adjacent to the particular power system through a communication line;
- a control apparatus operation predicting unit 56, functioning as an operation predicting means, for predicting operation conditions (for example, a control type, an operation time period and an operation degree) required for each of a plurality of control apparatuses of the particular power system according to the predicted electric information of the particular power system calculated in the predicted electric information calculating unit 54 and the measured electric information of the particular power system measured in the electric information measuring and storing unit 53 and predicting operation conditions (for example, a control type, an operation time period and an operation degree) required for each of a plurality of control apparatuses of a power system adjacent to the particular power system according to the predicted electric information and the measured electric information received in the information communicating unit 55 from the power system for each power system adjacent to the particular power system; and
- a control apparatus instructing unit 57, functioning as a control means, for estimating a first influence of the operation conditions, which are required for each control apparatus of one power system adjacent to the particular power system and are predicted in the control apparatus operation predicting unit 56, on an electric power (or a voltage) at the monitoring point of the particular power system for each power system adjacent to the particular power system, estimating a second influence of the operation conditions, which are required for each control apparatus of the particular power system and are predicted in the control apparatus operation predicting unit 56, on an electric power (or a voltage) at the monitoring point of one power system adjacent to the particular power system for each power system adjacent to the particular power system, selecting one or more control apparatuses to be controlled from all voltage/reactive power control apparatuses of the particular power system according to the first influence, the second influence and the predicted electric information calculated in the predicted electric information calculating unit 54 of the power system and controlling the selected control apparatuses according to the first influence, the second influence and the predicted electric information to adjust a voltage at the monitoring point of the particular power system for the purpose of suppressing a voltage fluctuation and/or a reactive power fluctuation at the monitoring point of the particular power system.

In the above configuration, an operation of the power system control apparatus 51 of the to-be-controlled power system 1 is described with reference to FIG. 21.

FIG. 21 is a flow chart showing a power system control method applied for each power system control apparatus according to the seventh embodiment.

When electric information such as a voltage value V(t), an effective power flow P(t) and a reactive power flow Q(t) placed at a voltage monitoring point is measured at a time t and stored in the electric information measuring and storing unit 53 (step ST21), predicted electric information such as a predicted voltage value $V_{predict}$, a predicted effective power flow and a predicted reactive power flow at the voltage monitoring point is calculated in the predicted electric information calculating unit 54 according to the measured electric information (step ST22).

For example, the predicted voltage value $V_{predict}$ is calculated according to an auto-regressive moving average (ARMA) model by using an equation (7):

$$V_{predict} = \sum_i a_i V(t-i) + \sum_j b_j Q(t-i) \qquad (7)$$

where the symbols $a_i$ and $b_j$ denote ARMA coefficients, the symbol V(t−i) denotes a measured voltage value of the monitoring point at a time (t−i), and the symbol Q(t−i) denotes a measured value of the reactive power flow of the monitoring point at a time (t−i).

Thereafter, operation conditions (for example, a control type, an operation time period and an operation degree) required for all voltage/reactive control apparatuses of the to-be-controlled power system 1 are predicted in the control apparatus operation predicting unit 56 according to the predicted electric information calculated in the predicted electric information calculating unit 54 of the to-be-controlled power system and the measured electric information measured in the electric information measuring and storing unit 53 of the to-be-controlled power system (step ST23).

Also, when electric information measured in the electric information measuring and storing unit 53 of one adjoining power system 2 and predicted electric information calculated in the predicted electric information calculating unit 54 of the adjoining power system 2 are received in the information communicating unit 55 through a communication line for each adjoining power system 2 (step ST24), operation conditions (for example, a control type, an operation time period and an operation degree) required for all voltage/reactive control apparatuses of the adjoining power system 2 are predicted in the control apparatus operation predicting unit 56 according to the predicted electric information and the measured electric information received from the adjoining power system 2 for each adjoining power system 2 (step ST25).

Thereafter, in the control apparatus instructing unit 57, first influence of the operation of each voltage/reactive control apparatus of one adjoining power system 2, of which the conditions are predicted in the control apparatus operation predicting unit 56, on an electric power at the monitoring point of the to-be-controlled power system 1 is estimated for each adjoining power system 2 (step ST26). For example, the first influence is calculated by using a prescribed transformation function in which the predicted operation conditions are substituted.

Also, in the control apparatus instructing unit 57, second influence of the operation of each voltage/reactive control apparatus of the to-be-controlled power system 1, of which the conditions are predicted in the control apparatus operation predicting unit 56, on an electric power at the monitoring point of one adjoining power system is estimated for each adjoining power system 2 (step ST27).

Thereafter, in the control apparatus instructing unit 57, one or more control apparatuses to be controlled are selected from the voltage/reactive power control apparatuses of the to-be-controlled power system 1 according to the first influence, the second influence and the predicted electric information calculated in the predicted electric information calculating unit 54 of the to-be-controlled power system 1, an operation instruction determined according to the first influence, the second influence and the predicted electric information is output to each selected control apparatus, and operations of the selected control apparatuses are controlled to adjust the electric information at the monitoring point of the to-be-controlled power system 1 to the predicted electric information (step ST28).

For example, in cases where a sum of the first influences of the adjoining power systems 2 indicates the increase of the reactive power of 50 MVA for the monitoring point of the to-be-controlled power system 1 and in cases where the predicted reactive power of the to-be-controlled power system 1 is higher than the measured reactive power of the to-be-controlled power system 1 by 80 MVA, operations of the selected control apparatuses are controlled to increase the reactive power at the monitoring point of the to-be-controlled power system 1 by 30 MVA (80 MVA−50 MVA).

Thereafter, the steps ST21 to ST28 are repeated until the operation of the selected control apparatus is not desired (step ST29).

Accordingly, because the operation conditions required for each voltage/reactive control apparatus of the to-be-controlled power system 1 are predicted according to the predicted electric information calculated in the predicted electric information calculating unit 54 of the to-be-controlled power system 1 and the measured electric information measured in the electric information measuring and storing unit 53 of the to-be-controlled power system 1 and because the operation conditions required for the control apparatuses of each adjoining power system 2 are predicted according to the predicted electric information and the measured electric information received from the adjoining power system 2 in the information communicating unit 55, one or more control apparatuses to be controlled can be selected from the voltage/reactive power control apparatuses of the to-be-controlled power system 1 according to locally-existing-information (for example, the predicted electric information and the measured electric information obtained in the to-be-controlled power system 1 and the predicted electric information and the measured electric information of the adjoining power system 2 transmitted to the to-be-controlled power system 1). Therefore, the cooperation of the to-be-controlled power system 1 with the adjoining power systems 2 can be performed by collecting the measured electric information and the predicted electric information locally existing in the power systems 1 and 2, and a voltage fluctuation and a reactive power fluctuation in the to-be-controlled power system 1 can be immediately suppressed.

What is claimed is:

1. A power system control apparatus comprising:

power flow measuring means for measuring a reactive power flow and an effective power flow, which respectively flow between a to-be-controlled power system and an adjoining power system adjacent to the to-be-controlled power system, for each adjoining power system;

desired value determining means for determining a desired reactive power flow or a desired sum of the reactive power flows according to the reactive power flows and the effective power flows measured by the power flow measuring means, a desired voltage of the to-be-controlled power system, and at least one of a plurality of desired voltages of the adjoining power systems;

required value calculating means for calculating a required reactive power of the to-be-controlled power system according to the reactive power flows and the effective power flow measured by the power flow measuring means, the desired reactive power flow or the desired sum of the reactive power flows determined by the desired value determining means, the desired voltage of the to-be-controlled power system, and a measured voltage of the to-be-controlled be-controlled power system; and control means for selecting a control apparatus from a plurality of control apparatuses arranged in the to-be-controlled power system according to the reactive power calculated by the required value calculating means and controlling operation of the control apparatus selected to reduce the required reactive power of the to-be-controlled power system.

2. The power system control apparatus according to claim 1, wherein the required reactive power calculated by the required value calculating means includes a term obtained by multiplying deviation of the measured voltage of the to-be-controlled power system from the desired voltage of the to-be-controlled power system, by a control constant.

3. The power system control apparatus according to claim 2, further comprising constant value changing means for changing the control constant or the desired voltage of the to-be-controlled power system when a system configuration of the to-be-controlled power system and the adjoining power system is changed.

4. The power system control apparatus according to claim 2, further comprising constant value changing means for changing the control constant when the desired voltage of the to-be-controlled power system or the desired voltage of one adjoining power system is changed.

5. A power system control apparatus comprising:

power flow measuring means for measuring a reactive power flow and an effective power flow flowing between each of partial power systems of a to-be-controlled power system and an adjoining power system and measuring reactive power flow and effective power flow flowing between one pair of partial power systems adjacent to each other for each pair of partial power systems adjacent to each other;

desired value determining means for determining a desired value of the reactive power flowing between one partial power system and the adjoining power system adjacent to the partial power system according to the reactive power flow and the effective power flow, which flow between the partial power system and the adjoining power system, measured by the power flow measuring means, a desired voltage of the partial power system, a desired voltage of the adjoining power system, a desired value of the reactive power flow flowing between one pair of partial power systems adjacent to each other according to the reactive power flow and the effective power flow, which flow between the pair of partial power systems, measured by the power flow measuring means, and two desired voltages of the pair of partial power systems for each pair of partial power systems adjacent to each other;

required value calculating means for calculating a required reactive power of each partial power system according to the reactive power flow and the effective power flow which flow between the partial power system and one adjoining power system adjacent to the partial power system, measured by the power flow measuring means, the reactive power flow and the effective power flow which flow between the partial power system and another partial power system adjacent to the partial power system, measured by the power flow measuring means, the desired reactive power flow which flows between the partial power system and the adjoining power system, and the desired reactive power flow which flows between the partial power system and another partial power system adjacent to the partial power system, determined by the desired value determining means, the desired voltage of the partial power system, and a measured voltage of the partial power system; and control means for selecting a control apparatus from a plurality of control apparatuses arranged in one partial power system according to the required reactive power of the partial power system calculated by the required value calculating means for each partial power system and controlling the control apparatus selected, of each partial power system to make the control apparatus selected reduce the required reactive power of the partial power system.

6. The power system control apparatus according to claim 5, wherein the required reactive power of each partial power system calculated by the required value calculating means includes a term obtained by multiplying deviation of the measured voltage of the partial power system from the desired voltage of the partial power system, by a control constant.

7. The power system control apparatus according to claim 6, further comprising constant value changing means for changing the control constant or the desired voltage of one partial power system when a system configuration of the partial power systems and the adjoining power systems is changed.

8. The power system control apparatus according to claim 6, further comprising constant value changing means for changing the control constant when the desired voltage of one partial power system or the desired voltage of one adjoining power system is changed.

9. A power system control apparatus comprising:

system predicting means for receiving a load prediction of a to-be-controlled power system and at least one of a plurality of adjoining power system adjacent to the to-be-controlled power system, predicting first electric information of the to-be-controlled power system and second electric information between the to-be-controlled power system and each adjoining power system by calculating a power flow between the to-be-controlled power system and each adjoining power system according to the load prediction;

operation predicting means for predicting operation of each of at least one of a plurality of control apparatuses arranged in the to-be-controlled power system according to the first electric information and the second electric information predicted by the system predicting means; and schedule setting means for setting an operation schedule of the control apparatuses according to the operation prediction produced by the operation predicting means to operate the control apparatuses according to the operation schedule.

10. A power system control apparatus according to claim 9, further comprising:

power flow measuring means for measuring a reactive power flow and an effective power flow, which respectively flow between a to-be-controlled power system and each adjoining power system adjacent to the to-be-controlled power system;

desired value determining means for determining a desired reactive power flow according to the reactive power flows and the effective power flows measured by the power flow measuring means, a desired voltage of the to-be-controlled power system, and at least one of a plurality of desired voltages of the adjoining power systems;

required value calculating means for calculating a required reactive power of the to-be-controlled power system according to the reactive power flows and the effective power flows measured by the power flow measuring means, the desired reactive power flow determined by the desired value determining means, the desired voltage of the to-be-controlled power system, and a measured voltage of the to-be-controlled power system;

control means for selecting a control apparatus from the control apparatuses according to the reactive power calculated by the required value calculating means, determining an operation instruction required for the selected control apparatus according to the required reactive power, and providing the operation instruction for the control apparatus selected to reduce the required reactive power of the to-be controlled power system in operation of the control apparatus selected and indicated by the operation instruction; and schedule revising means for revising the operation schedule of the control apparatuses set by the schedule setting means to make a revised operation schedule match the operation of the control apparatus selected by the control means when the control apparatus selected by the control means or the operation of the control apparatus selected by the control means does not match the operation schedule of the control apparatuses, the control apparatuses being operated according to the revised operation schedule.

11. A power system control apparatus comprising:

electric information predicting means for calculating a predicted value of first electric information corresponding to a to-be-controlled power system from a measured value of the first electric information of the to-be-controlled power system;

communicating means for receiving a predicted value of second electric information and a measured value of the second electric information from each of at least one of a plurality of adjoining power systems adjacent to the to-be-controlled power system;

operation predicting means for predicting operation of each of a plurality of first control apparatuses arranged in the to-be-controlled power system from the predicted value of the first electric information and the measured value of the first electric information, produced by the electric information predicting means, and predicting operation of each of a plurality of second control apparatuses arranged in one adjoining power system from the predicted value of the second electric information and the measured value of the second electric information received by the communicating means from the adjoining power system for each adjoining power system;

control means for selecting one of the first control apparatus from the first control apparatuses arranged in the to-be-controlled power system according to the operation prediction or the first control apparatuses and the operation prediction for the second control apparatus produced by the operation predicting means and controlling the control apparatus selected to adjust the first electric information of the to-be-controlled power system to the predicted value produced by the electric information predicting means.

12. A power system control method comprising:

measuring a reactive power flow and an effective power flow, which respectively flow between a to-be-controlled power system and an adjoining power system adjacent to the to-be-controlled power system;

determining a desired reactive power flow according to the reactive power flow measured and the effective power flow measured, a desired voltage of the to-be-controlled power system, and a desired voltage of the adjoining power systems;

calculating a required value of reactive power of the to-be-controlled power system according to the reactive power flow measured, the effective power flow measured, the desired reactive power flow, the desired voltage of the to-be-controlled power system, and a measured voltage of the to-be-controlled power system;

selecting a control apparatus from a plurality of control apparatuses arranged in the to-be-controlled power system according to the required reactive power; and controlling operation of the control apparatus selected to reduce the required reactive power of the to-be-controlled power system.

13. A power system control method comprising:

measuring a reactive power flow and an effective power flow flowing between each of partial power systems of a to-be-controlled power system and an adjoining power system adjacent to the partial power system;

measuring a reactive power flow and an effective power flow flowing between one pair of partial power systems adjacent to each other for each pair of partial power systems adjacent to each other;

determining a desired reactive power flow flowing between one partial power system and the adjoining power system adjacent to the partial power system according to the reactive power flow measured and the effective power flow measured flowing between the partial power system and the adjoining power system, a desired voltage of the partial power systems, and a desired voltage of the adjoining power system for each partial power system;

determining a desired reactive power flow flowing between one pair of partial power systems adjacent to each other according to the reactive power flow measured and the effective power flow measured as flowing between the pair of partial power systems, and two desired voltages of the pair of partial power systems for each pair of partial power systems adjacent to each other;

calculating a required reactive power of each partial power system according to the reactive power flow measured and the effective power flow measured as flowing between the partial power system and one adjoining power system, the reactive power flow measured and the effective power measured as flow flowing between the partial power system and another partial power system adjacent to the partial power system, the desired reactive power flow flowing between the partial power system and the adjoining power system, the desired reactive power flow flowing between the partial power system and another partial power system adjacent to the partial power system, the desired voltage of the partial power system, and a measured voltage of the partial power system;

selecting a control apparatus from a plurality of control apparatuses arranged in one partial power system according to the required reactive power of the partial power system for each partial power system; and controlling operation of the control apparatus of each partial power system selected to reduce the required reactive power of the partial power system.

14. A power system control method comprising:

receiving a load prediction of a to-be-controlled power system and of at least one of a plurality of adjoining power systems adjacent to the to-be-controlled power system;

predicting first electric information of the to-be-controlled power system by calculating a power flow between the to-be-controlled power system and each adjoining power system according to the load prediction;

predicting second electric information between the to-be-controlled power system and each adjoining power system according to the load prediction;

predicting operation of each of at least one of a plurality of control apparatuses arranged in the to-be-controlled power system according to the first electric information and the second electric information; and setting an operation schedule of the control apparatuses according to the operation prediction to operate the control apparatuses according to the operation schedule.

15. A power system control method comprising:

calculating a predicted value of first electric information corresponding to a to-be-controlled power system from a measured value of the first electric information of the to-be-controlled power system;

receiving a predicted value of second electric information and a measured value of the second electric information from each of at least one of a plurality of adjoining power systems adjacent to the to-be-controlled power system;

predicting an operation of each of a plurality of first control apparatuses arranged in the to-be-controlled power system from the predicted value of the first electric information and the measured value of the first electric information;

predicting operation of each of a plurality of second control apparatuses arranged in one adjoining power system from the predicted value of the second electric information and the measured value of the second electric information received from the adjoining power system for each adjoining power system;

selecting a particular first control apparatus from the first control apparatuses arranged in the to-be-controlled power system according to the operation prediction for the first control apparatuses and the operation prediction for the second control apparatuses; and controlling the control apparatus selected to adjust the first electric information of the to-be-controlled power system to the predicted value.

* * * * *